United States Patent
Agrahari et al.

(10) Patent No.: US 11,837,004 B1
(45) Date of Patent: Dec. 5, 2023

(54) SEARCHABLE TABLE EXTRACTION

(71) Applicant: Oracle Financial Services Software Limited, Mumbai (IN)

(72) Inventors: Shivam Agrahari, Bansi (IN); Dakshayani Singaraju, Tirupati (IN); Veresh Jain, Bangalore (IN)

(73) Assignee: Oracle Financial Services Software Limited, Mumbai (IN)

( * ) Notice: Subject to any disclaimer, the term of this patent is extended or adjusted under 35 U.S.C. 154(b) by 0 days.

(21) Appl. No.: 18/174,076

(22) Filed: Feb. 24, 2023

(51) Int. Cl.
| | |
|---|---|
| *G06F 30/00* | (2020.01) |
| *G06V 30/412* | (2022.01) |
| *G06V 30/19* | (2022.01) |
| *G06F 40/143* | (2020.01) |
| *G06F 16/835* | (2019.01) |
| *G06V 10/82* | (2022.01) |
| *G06F 40/103* | (2020.01) |
| *G06V 30/413* | (2022.01) |
| *G06V 30/16* | (2022.01) |

(52) U.S. Cl.
CPC ........ *G06V 30/412* (2022.01); *G06F 16/8373* (2019.01); *G06F 40/103* (2020.01); *G06F 40/143* (2020.01); *G06V 10/82* (2022.01); *G06V 30/16* (2022.01); *G06V 30/19147* (2022.01); *G06V 30/413* (2022.01)

(58) Field of Classification Search
CPC ...... G06V 30/412; G06V 10/82; G06V 30/16; G06V 30/19147; G06V 30/413; G06F 16/8373; G06F 40/103; G06F 40/143
See application file for complete search history.

(56) References Cited

U.S. PATENT DOCUMENTS 4,787,035 A * 11/1988 Bourne ............... G06F 9/45508
 700/247
5,995,918 A * 11/1999 Kendall ............... G06F 40/279
 704/275

(Continued)

OTHER PUBLICATIONS

GCFGlobal, "Excel 2016: Filtering Data", Jan. 20, 2022, GCFGlobal 15 pages + 1 screenshot https://web.archive.org/web/20220120111922/ https://edu.gcfglobal.org/en/excel2016/filtering-data/1/.*
Acampora, Jon, "How to Add a Search Box to a Slicer to QuicklyFilter Pivot Tables and Charts + Video", Feb. 16, 2016, Excel Campus, 17 page https://www.excelcampus.com/pivot-tables/add-search-box-to-slicer/.*

(Continued)

*Primary Examiner* — William L Bashore
*Assistant Examiner* — David Faber
(74) *Attorney, Agent, or Firm* — Kilpatrick Townsend & Stockton LLP

(57) ABSTRACT

Method includes generating a base model by training a pretrained model using a base training dataset including first training datapoints identifying tables in historical document images that include the tables and text, where the generated base model is configured to extract the tables as objects; and generating a table extraction model by training the base model using an enhanced training dataset including second training datapoints that are different from the first training datapoints and identify a plurality of cells disposed in each of the tables in a row direction and a column direction. The table extraction model is trained to output content of the tables and table information in an XML format, the table information including cell level information of the plurality of cells that is searchable via a query configured to provide target content that corresponds to one or more cells.

20 Claims, 23 Drawing Sheets

(56) References Cited

U.S. PATENT DOCUMENTS

| | | | | |
|---|---|---|---|---|
| 8,443,278 | B2* | 5/2013 | Mansfield | G06V 30/414 |
| | | | | 715/227 |
| 8,812,537 | B1* | 8/2014 | Kapoor | G06F 16/24564 |
| | | | | 707/769 |
| 9,940,365 | B2* | 4/2018 | Zoryn | G06F 16/24578 |
| 10,706,218 | B2 | 7/2020 | Milward et al. | |
| 10,769,503 | B1* | 9/2020 | Buhler | G06F 16/56 |
| 11,010,543 | B1 | 5/2021 | Wesanekar et al. | |
| 11,194,797 | B2 | 12/2021 | Canim et al. | |
| 11,380,116 | B2* | 7/2022 | Zhong | G06V 30/414 |
| 11,443,416 | B2* | 9/2022 | Liao | G06F 16/5854 |
| 2001/0047372 | A1* | 11/2001 | Gorelik | G06F 16/84 |
| | | | | 715/239 |
| 2004/0268235 | A1* | 12/2004 | Wason | G06F 40/232 |
| | | | | 715/255 |
| 2011/0164813 | A1* | 7/2011 | Enomoto | G06F 40/177 |
| | | | | 382/164 |
| 2016/0012052 | A1* | 1/2016 | Zoryn | G06F 16/24578 |
| | | | | 707/728 |
| 2017/0220858 | A1* | 8/2017 | Stitz | G06V 30/412 |
| 2017/0329749 | A1* | 11/2017 | Milward | G06F 40/166 |
| 2021/0117668 | A1* | 4/2021 | Zhong | G06N 3/044 |
| 2021/0201013 | A1* | 7/2021 | Makhija | G06V 30/414 |
| 2021/0390294 | A1* | 12/2021 | Huang | G06N 3/044 |
| 2022/0044011 | A1* | 2/2022 | Shanmugasundaram | |
| | | | | G06T 3/608 |
| 2022/0067014 | A1* | 3/2022 | Yu | G06F 16/93 |
| 2022/0284215 | A1* | 9/2022 | Rastogi | G06F 16/93 |
| 2022/0318240 | A1* | 10/2022 | Wei | G06N 3/0464 |
| 2022/0319217 | A1* | 10/2022 | Paliwal | G06V 30/414 |
| 2023/0095673 | A1* | 3/2023 | Dharmasiri | G06V 10/82 |
| | | | | 382/157 |
| 2023/0153641 | A1* | 5/2023 | Manda | G06N 5/022 |
| | | | | 707/603 |

OTHER PUBLICATIONS

Qasim et al "Rethinking Table Recognition using Graph Neural Networks", Jul. 3, 2019, 6 pages.*

Mair et al, "Using Computer Vision to Identify and Extract Tables from Various File Formats", Aug. 18, 2021, GenInvo, 22 pages + 1 screenshot https://www.lexjansen.com/phuse-us/2021/ml/PRE_ML06.pdf.*

"Document Layout Analysis", Available at https://learn.microsoft.com/en-us/azure/applied-ai-services/form-recognizer/concept-layout?view=form-recog-3.0.0, Oct. 27, 2022, pp. 1-11.

"How can I Extract Table Rows from a Document?", Available online at https://support.docparser.com/article/1293-how-can-i-extract-table-rows-from-a-document, Oct. 11, 2021, 3 pages.

"Powerful Data Capture And Workflow Automation Features From Docparser", Available online at https://docparser.com/features/, Accessed from Internet on Dec. 19, 2022, pp. 1-2.

"Your Zero-Coding Solution for Blazing Fast Data Processing", Available online at https://docparser.com/, Accessed from Internet on Dec. 19, 2022, 2 pages.

Gilani et al., "Table Detection Using Deep Learning", International Conference on Document Analysis and Recognition (ICDAR), Nov. 9-15, 2017, 6 pages.

Perez-Arriaga et al., "TAO: System for Table Detection and Extraction from PDF Documents", Proceedings of the Twenty-Ninth International Florida Artificial Intelligence Research Society Conference, Mar. 30, 2016, pp. 591-596.

Prasad et al., "CascadeTabNet An Approach For End To End Table Detection and Structure Recognition from Image-based Documents", Available online at https://arxiv.org/ftp/arxiv/papers/2004/2004.12629.pdf, Jun. 2020, 10 pages.

Sun et al., "Enhanced Table Extraction from Documents with form Recognizer", Available online at https://techcommunity.microsoft.com/t5/ai-cognitive-services-blog/enhanced-table-extraction-from-documents-with-form-recognizer/ba-p/2058011, Jan. 14, 2021, 4 pages.

Wei et al., "Table Extraction for Answer Retrieval", Information Retrieval Journal, vol. 9, No. 5, Nov. 2006, pp. 1-26.

* cited by examiner

FIG. 2B
208

The following table provides the estimated pension and postretirement benefit payments ← 226
that are payable from the plans to participants.

210

|  | Qualified and Non-qualified Pension Benefits | | Postretirement Benefits |
|---|---|---|---|
| (Millions) | United States | International | |
| 2020 Benefits Payments | $ 1,103 | $ 246 | $ 121 |
| 2021 Benefits Payments | 1,096 | 253 | 128 |
| 2022 Benefits Payments | 1,104 | 272 | 136 |
| 2023 Benefits Payments | 1,106 | 284 | 142 |
| 2024 Benefits Payments | 1,111 | 302 | 148 |
| Next five years | 5,521 | 1,656 | 789 |

The discussion that follows references the fair value measurement of certain assets in terms of levels 1, 2, and 3. See Note 15 for descriptions of these levels. While the company believes the valuation methods are appropriate and consistent with other market participants, the use of different methodologies are assumptions to determine the fair value of certain financial instruments could result in a different estimate of fair value at the reporting date. ← 228

The following table provides the estimated pension and postretirement benefit payments that are payable from the plans to participants.

↙ 214 TABLE

| (Millions) | Qualified and Non-qualified Pension Benefits | | Postretirement Benefits |
|---|---|---|---|
| | United States | International | |
| 2020 Benefits Payments | $ 1,103 | $ 246 | $ 121 |
| 2021 Benefits Payments | 1,096 | 253 | 128 |
| 2022 Benefits Payments | 1,104 | 272 | 136 |
| 2023 Benefits Payments | 1,106 | 284 | 142 |
| 2024 Benefits Payments | 1,111 | 302 | 148 |
| Next five years | 5,521 | 1,656 | 789 |

― 212

The discussion that follows references the fair value measurement of certain assets in terms of levels 1, 2, and 3. See Note 15 for descriptions of these levels. While the company believes the valuation methods are appropriate and consistent with other market participants, the use of different methodologies are assumptions to determine the fair value of certain financial instruments could result in a different estimate of fair value at the reporting date.

The following table provides the estimated pension and postretirement benefit payments that are payable from the plans to participants.

UNSTRUCTURED TABLE — 220

| (Millions) | Qualified and Non-qualified Pension Benefits | | Postretirement Benefits |
|---|---|---|---|
| CELL | CELL United States | CELL International | CELL |
| 2020 Benefits Payments CELL | CELL $ CELL 1,103 | CELL $ CELL 246 | CELL $ CELL 121 |
| 2021 Benefits Payments CELL | CELL 1,096 | CELL 253 | CELL 128 |
| 2022 Benefits Payments CELL | CELL 1,104 | CELL 272 | CELL 136 |
| 2023 Benefits Payments CELL | CELL 1,106 | CELL 284 | CELL 142 |
| 2024 Benefits Payments CELL | CELL 1,111 | CELL 302 | CELL 148 |
| Next five years | CELL 5,521 | CELL 1,656 | CELL 789 |

The discussion that follows references the fair value measurement of certain assets in terms of levels 1, 2, and 3. See Note 15 for descriptions of these levels. While the company believes the valuation methods are appropriate and consistent with other market participants, the use of different methodologies are assumptions to determine the fair value of certain financial instruments could result in a different estimate of fair value at the reporting date.

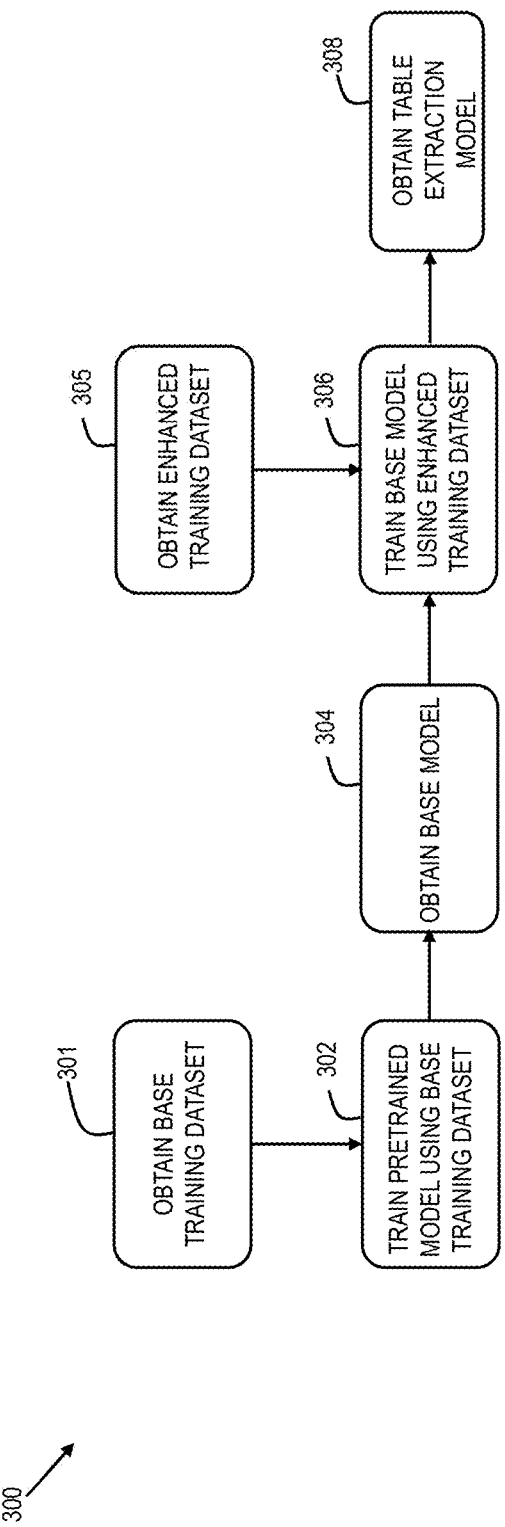

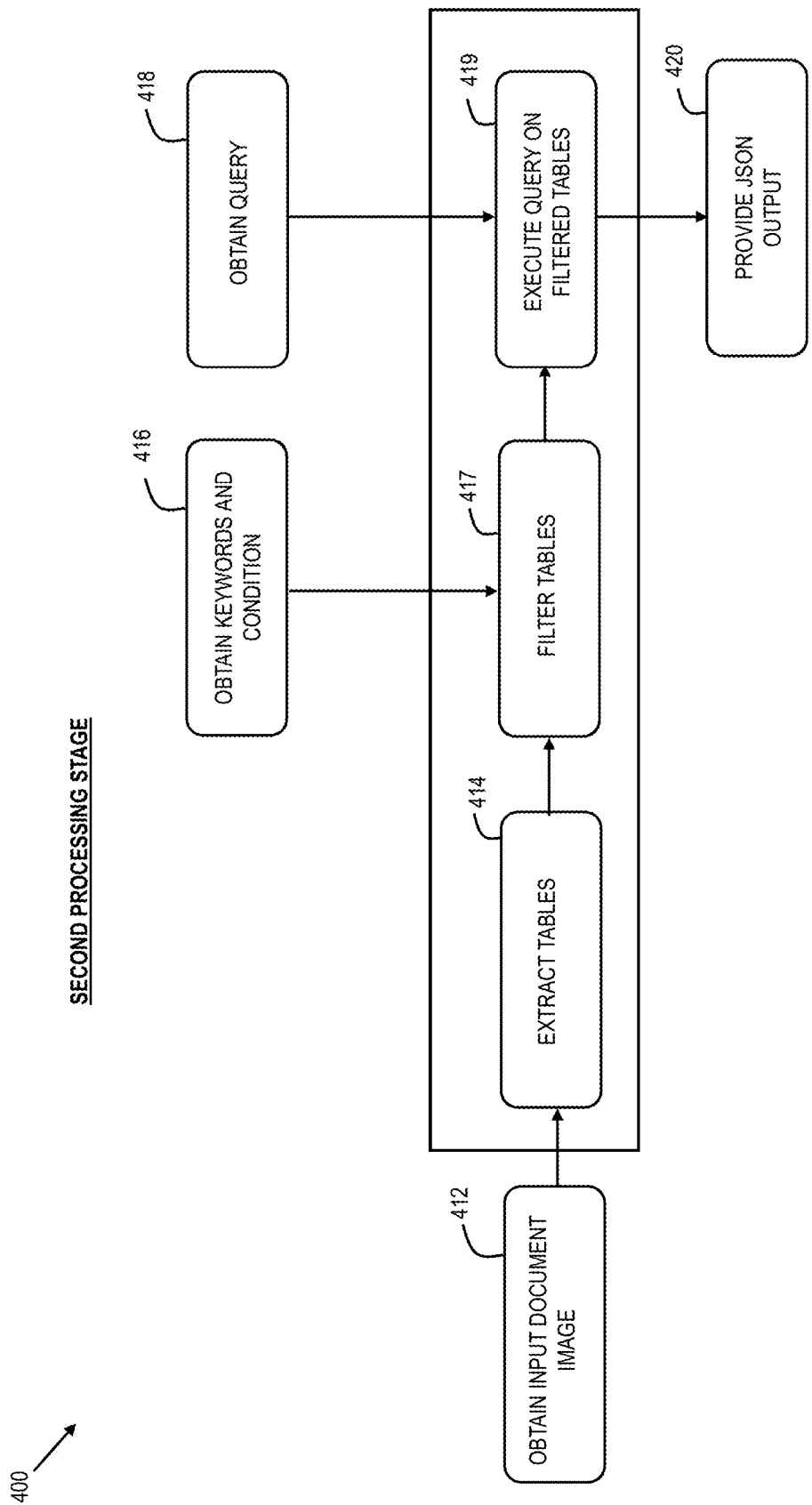

FIG. 5A

```
<?xml version="1.0" encoding="UTF-8"?>
<document>
    <table>
        <cell end-col="0" end-row="0" start-col="0" start-row="0">                    ← 502
            <Coords points="350,256 350,269 388,269                                    ⎤
                            388,256"/> </cell>                                         ⎦ 504
        <cell end-col="1" end-row="0" start-col="1" start-row="0">                    ← 502
            <Coords points="658,258 658,270 746,270                                    ⎤
                            746,258"/> </cell>                                         ⎦ 504
        <cell end-col="0" end-row="1" start-col="0" start-row="1">                    ← 502
            <Coords points="499,271 499,326 569,326                                    ⎤
                            569,271"/> </cell>                                         ⎦ 504
        <cell end-col="0" end-row="2" start-col="0" start-row="2">                    ← 502
            <Coords points="10,335 10,347 95,347 95,335"/>                             ⎤ 504
        </cell>
        <cell end-col="1" end-row="2" start-col="1" start-row="2">                    ← 502
            <Coords points="676,336 676,347 728,347                                    ⎤
                            728,336"/> </cell>                                         ⎦ 504
        <cell end-col="1" end-row="3" start-col="1" start-row="3">                    ← 502
            <Coords points="677,358 677,369 728,369                                    ⎤
                            728,358"/> </cell>                                         ⎦ 504
    </table>
</document>
```

```xml
<?xml version="1.0" encoding="UTF-8"?>
<document>
    <table>
        <cell end-col="0" end-row="0" start-col="0" start-row="0">      ← 502
            <Texts text="A"/>      ← 512
        </cell>
        <cell end-col="1" end-row="0" start-col="1" start-row="0">      ← 502
            <Texts text="B"/>      ← 512
        </cell>
        <cell end-col="0" end-row="1" start-col="0" start-row="1">      ← 502
            <Texts text="C"/>      ← 512
        </cell>
        <cell end-col="0" end-row="2" start-col="0" start-row="2">      ← 502
            <Texts text="D"/>      ← 512
        </cell>
        <cell end-col="1" end-row="2" start-col="1" start-row="2">      ← 502
            <Texts text="E"/>      ← 512
        </cell>
        <cell end-col="1" end-row="3" start-col="1" start-row="3">      ← 502
            <Texts text="F"/>      ← 512
        </cell>
    </table>
</document>
```

510

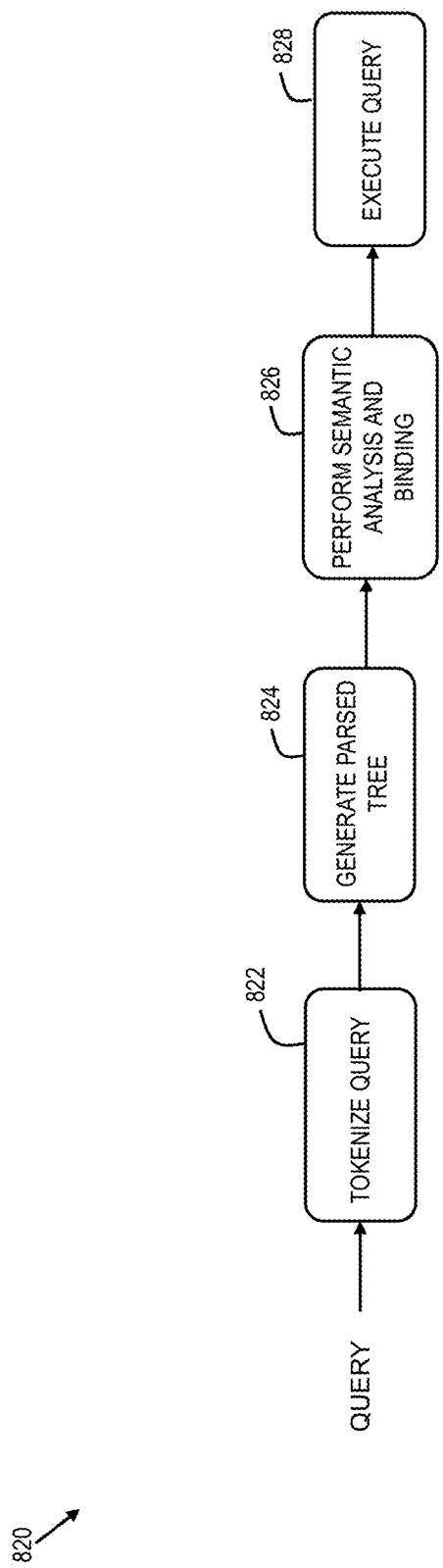

SEARCHABLE TABLE EXTRACTION

FIELD

The present disclosure relates generally to artificial intelligence techniques, and more particularly, to extracting tables from document images so that the tables can be searched by using a query.

BACKGROUND

Artificial intelligence (AI) and machine learning (ML) have many applications. For example, using artificial intelligence models or algorithms, content, e.g., text of the document image can be extracted. However, extracting the tables from a multi-page document image is a non-trivial task.

Much of the electronic information is contained within unstructured text, such as, word processing documents, hyper-text documents, presentation slides, scanned images or texts, among other formats. Many of the documents include tables containing data, e.g., in a tabular format. The tables used in unstructured documents are not easily extractable, due to, e.g., being open-ended, schema-less, unstructured, or for other reasons. For example, the tables can be of different sizes (e.g., different numbers of rows and columns, different and potentially unequal sizes of cells), have different styles (e.g., with borders, without borders, without demarcation of rows and columns), and have different formats (e.g., ambiguous structures).

Thus, using artificial intelligence to identify, extract, and search the information in the tables of the documents is difficult because of various formats of the tables and the documents, insufficient understanding of the layout of the tables, and of relationships between cells in the table.

SUMMARY

Techniques disclosed herein relate generally to artificial intelligence techniques. More specifically and without limitation, techniques disclosed herein relate to a novel technique for extracting tables as objects from the document images. Additionally, techniques described herein are for executing a query on tables. Various embodiments are described herein to illustrate various features. These embodiments include various methods, systems, non-transitory computer-readable storage media storing programs, code, or instructions executable by one or more processors, and the like.

In various embodiments, a computer-implemented method is provided that includes: generating a base model by training a pretrained model using a base training dataset including first training datapoints identifying tables in historical document images that include the tables and text, where the generated base model is configured to extract the tables as objects; and generating a table extraction model by training the base model using an enhanced training dataset, the enhanced training dataset including second training datapoints that are different from the first training datapoints and identify a plurality of cells disposed in each of the tables in a row direction and a column direction. The table extraction model is trained to output content of the tables and table information in an eXtensible Markup Language (XML) format, the table information including cell level information of the plurality of cells that is searchable via a query configured to provide target content that corresponds to one or more cells among the plurality of cells.

In some embodiments, the generating the base model further includes: generating first annotated document images based on the historical document images, the first annotated document images including annotations indicating borders surrounding the tables, respectively, and tags indicating content within each of the borders to be a table; preprocessing the first annotated document images to generate augmented first annotated document images; and training the pretrained model using the augmented first annotated document images. The augmented first annotated document images are the first training datapoints.

In some embodiments, the generating the table extraction model further includes: generating second annotated document images based on the first annotated document images, the second annotated document images including annotations indicating a table type, borders surrounding the plurality of cells, respectively, and tags indicating content within the borders surrounding the plurality of cells to correspond to a cell, where the table type is a structured table or an unstructured table; preprocessing the second annotated document images to generate augmented second annotated document images; and training the base model using the augmented second annotated document images. The augmented second annotated document images are the second training datapoints.

In some embodiments, the table extraction model is configured to output the table information including a table type and table coordinates, and output the cell level information including coordinates and texts of the plurality of cells.

In some embodiments, the preprocessing performed on the first annotated document images includes performing at least one image-processing technique from among brightening, darkening, rotating, dilating, and smudging, and the preprocessing performed on the second annotated document images includes performing at least one image-processing technique from among brightening, darkening, rotating, dilating, and smudging.

In some embodiments, the pretrained model is a convolutional neural network (CNN) pretrained model configured to extract objects from images, the base model is a CNN-based model enhanced from the CNN pretrained model to extract tables as objects from document images, and the table extraction model is an enhanced base model enhanced from the base model to classify the tables into structured and unstructured tables, and detect cell coordinates and cell content of the plurality of cells.

In some embodiments, the computer-implemented method further includes: obtaining an input document image including a plurality of tables within text, as an input to the table extraction model; extracting, by the table extraction model, at least one first table among the plurality of tables from the input document image, where the at least one first table is a structured table; and extracting, by the table extraction model, at least one second table among the plurality of tables from the input document image, where the at least one second table is an unstructured table including at least one nested table.

In various embodiments, a computer-implemented method is provided that includes: extracting, by a table extraction model from an input document image, a plurality of tables as a plurality of objects, the plurality of tables including a plurality of cells, respectively; outputting, by the table extraction model, the plurality of tables in an eXtensible Markup Language (XML) format and outputting cell level information of the plurality of cells; filtering the plurality of tables based on one or more keywords, to reduce a number of the plurality of tables; outputting filtered tables that include the one or more keywords among the plurality of tables; executing a query on the filtered tables, the query including one or more keys composed based on the cell level information associated with the filtered tables; identifying one or more cells among the plurality of cells based on the one or more keys; and providing target content that corresponds to the one or more cells, where the target content is a response to the query.

In some embodiments, the extracting further includes extracting coordinates of the plurality of cells as the cell level information.

In some embodiments, the one or more keywords are included in a plurality of keywords, and the filtering further includes obtaining a condition for the filtering, the condition including one from among AND OR. For each of the plurality of keywords, the filtering further includes generating a sub-keywords list including one or more sub-keywords, where each of the one or more sub-keywords is composed of one or more words of the keyword, and traversing each of the plurality of tables along a row direction and a column direction using, one by one, the one or more sub-keywords from the sub-keywords list.

In some embodiments, the filtering further includes determining whether at least one table of the plurality of tables contains a first keyword of the plurality of keywords, and determining whether the at least one table contains a second keyword of the plurality of keywords.

In some embodiments, the filtering further includes, for the condition being AND: based on the at least one table containing the first keyword and the second keyword, outputting the at least one table, as at least one filtered table, and based on the at least one table not containing the first keyword and the second keyword, not outputting the at least one table.

In some embodiments, the filtering further includes, for the condition being OR: based on the at least one table containing at least one from among the first keyword and the second keyword, outputting the at least one table, as the at least one filtered table.

In some embodiments, the filtering further includes: initializing a vector including an array having a number of elements equal to a number of the plurality of keywords, based on the at least one table containing the first keyword, generating a value of 1 as a first element of the array, based on the at least one table containing the second keyword, generating a value of 1 as a second element of the array, based on the condition being AND, outputting the at least one table if the first element and the second element have the value of 1, and based on the condition being OR, outputting the at least one table if at least one from among the first element and the second element has the value of 1.

In some embodiments, the executing the query further includes: obtaining cell level information associated with each of the filtered tables, the cell level information including, for each of the filtered tables, coordinates of cells and table architecture; and deriving grammar and rules specific to each of the filtered tables, using the coordinates of cells and the table architecture.

In some embodiments, the executing the query further includes creating the query based on the grammar and rules specific to each of the filtered tables.

In some embodiments, at least one of the filtered tables is a nested table, and the query further includes at least one composite key that expresses parent-child relationship of a header and at least one sub-header present in the nested table.

In some embodiments, the computer-implemented method further includes: prior to the extracting the plurality of tables, generating the table extraction model by performing an iterative learning transfer, the performing the iterative learning transfer including: training a pretrained model using a base training dataset including training datapoints associated with tables in historical document images including tables and text, to generate a base model; and training the base model using an enhanced training dataset, to generate the table extraction model, the enhanced training dataset including training datapoints associated with the plurality of cells disposed in each of the tables.

In some embodiments, the pretrained model is a convolutional neural network (CNN) pretrained model configured to extract objects from images, the base model is a CNN-based model enhanced from the CNN pretrained model to extract tables as objects from document images, and the table extraction model is an enhanced base model enhanced from the base model to classify the tables into structured and unstructured tables, and detect cell coordinates and cell content of the plurality of cells.

In various embodiments, a system is provided that includes one or more data processors and a non-transitory computer readable storage medium containing instructions which, when executed on the one or more data processors, cause the one or more data processors to perform part or all of one or more methods disclosed herein.

In various embodiments, a computer-program product is provided that is tangibly embodied in a non-transitory machine-readable storage medium and that includes instructions configured to cause one or more data processors to perform part or all of one or more methods disclosed herein.

The techniques described above and below may be implemented in a number of ways and in a number of contexts. Several example implementations and contexts are provided with reference to the following figures, as described below in more detail. However, the following implementations and contexts are but a few of many.

BRIEF DESCRIPTION OF THE DRAWINGS

FIG. 2B depicts a portion of a historical document image, according to various embodiments.

FIG. 2C depicts a portion of an annotated historical document image, according to various embodiments.

FIG. 2D depicts a portion of an annotated historical document image, according to various embodiments.

FIG. 3 is a flowchart of a method according to various embodiments.

FIG. 4 is a flowchart of a method according to various embodiments.

FIG. 5A illustrates an example of an output of the table extraction model, according to various embodiments.

FIG. 5B illustrates an example of an output of the table extraction model where post-processing is performed, according to various embodiments.

FIG. 8B is a flowchart of a method according to various embodiments.

DETAILED DESCRIPTION

Figure 1A:
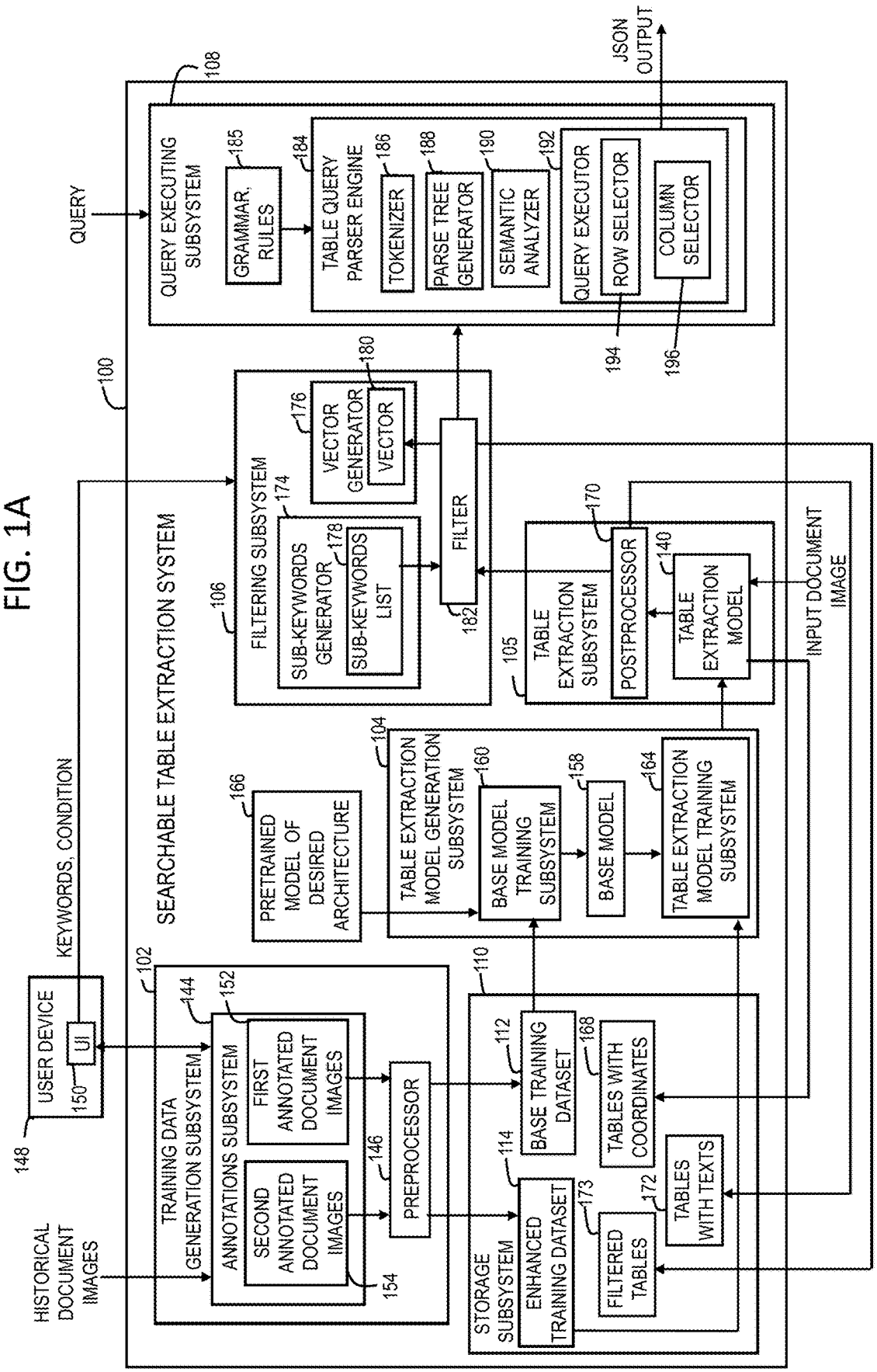
FIG. 1A is a block diagram of a searchable table extraction system according to various embodiments.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

I. Introduction

The present disclosure relates generally to artificial intelligence techniques, and more particularly, techniques disclosed herein relate to a novel technique for extracting tables as objects from the document images. The techniques disclosed herein convert multiple tables present within a multi-page document image into a searchable asset that can be searched with Structured Query Language (SQL)-like queries.

For purposes of this disclosure, a document image is an image of a document that may be generated using an imaging device such as a scanner (e.g., by scanning a document) or a camera (e.g., by a camera capturing an image of a document), and the like. A document image is different from a text-based document, which is a document created using a text editor (e.g., Microsoft WORD, EXCEL) and in which the contents of the document, such as words, tables, etc., are preserved in the document and are easily extractable from the document. In contrast, in a document image, the words, tables, etc., are lost and not preserved—instead, a document image includes pixels and the contents of the document are embedded in the values of the pixels.

Given a document, it is desirable that the contents of the document be accurately extracted. Some businesses have a great amount of the data embedded in the tables present within large documents. Valuable information can be contained within tables that are themselves embedded in the documents, e.g., full-text journal articles, patents, slides, health records, etc. For example, experimental results may be contained within a table in a PowerPoint presentation, key lab values relevant to a patient may be contained within a table in an electronic health record, etc. Information contained within tables is hard to extract automatically with high accuracy due to the wide variety and low quality of typical tables found in the electronic documents.

Automated techniques have been introduced to automate the task of extracting content from a document, and more particularly, to extract tables from a document and to convert the content into an editable form or machine-readable form. This is a difficult and computationally intensive task given the different variations in which a table can be represented in a document image. For example, the tables can be of different sizes (e.g., different numbers of rows and columns, different and potentially unequal sizes of cells), have different styles (e.g., with borders, without borders, without demarcation of rows and columns), and have different formats (e.g., ambiguous structures). The document image itself may be of bad quality (e.g., low resolution, presence of noise) making the extraction task even more difficult.

One technique has been proposed to perform table extraction from the HTML documents (or other documents converted to HTML) using, as information, HTML tags, to extract tables. However, this technique is not applicable to the extraction of the tables present in the document images, e.g., PDF files.

Another technique has been proposed to perform table extraction from documents containing only tables. However, this technique does not work for the document images that contain other type of content, e.g., text, images, etc.

Yet another technique has been proposed to distinguish the table structure within the document using spacings between characters (for semi-structured tables) followed by extracting tabular content. However, this technique is complicated in that it uses computer vision to identify tables and creates a table-like structure using spacings between text characters. Additionally, this approach generates a great number of false results.

The techniques described herein overcome the above-mentioned problems and other problems.

In various embodiments, the described techniques extract, from the document images and other documents (e.g., HyperText Markup Language (HTML) documents, XML documents, word documents, PPT documents, etc.) tables with borders and tables without borders having any architecture (e.g., nested tables) with high levels of accuracy, using a specialized CNN-based model.

In various embodiments, the described techniques can extract the table as an object. E.g., the described techniques treat the table as an image present in the PDF document, and, thus, the described techniques can extract tables with very high accuracy from any type of document. In comparison, as described above, the related art technique uses computer vision to identify tables using spacings between the characters and, thus, this related art technique generates a great number of false results.

Further, the described techniques can convert any type of the table, e.g., an image present in the PDF document, into a searchable format that can be searched by using a novel SQL-like query.

In various embodiments, the described techniques automatically detect the architecture of the tables, create the grammar and rules based on the architecture of the tables, and then generate a specialized query based on the grammar and rules. To the contrary, in the related art techniques, the user provides grammar and rules for the query, e.g., by manually annotating the table.

In various embodiments, the described techniques allow to extract all tables in the input document image containing multiple pages and multiple tables, e.g., nested tables, and provide the ability to search only the tables that are of interest to the user by using SQL-like queries. The tables that are of interest to the user are identified and extracted prior to executing the query, based on the keyword search. To the contrary, the search of the related art techniques is performed on all identified tables and is limited to the keyword search and/or the search using ML model, e.g., natural language processing model (NLP) model. Such searches cannot surely retrieve all the tables from the documents with required levels of accuracy.

II. System

FIG. 1A is a simplified block diagram of a searchable table extraction system 100 according to certain embodiments. The searchable table extraction system 100 may be implemented using one or more computer systems, each computer system having one or more processors. The searchable table extraction system 100 may include multiple components and subsystems communicatively coupled to each other via one or more communication mechanisms. For example, in the embodiment depicted in FIG. 1A, the searchable table extraction system 100 includes a training data generation subsystem 102, a table extraction model generation subsystem 104, a table extraction subsystem 105, a filtering subsystem 106, and a query executing subsystem 108. These subsystems may be implemented as one or more computer systems. The systems, subsystems, and other components depicted in FIG. 1A may be implemented in software (e.g., code, instructions, program) executed by one or more processing units (e.g., processors, cores) of the respective systems, using hardware, or combinations thereof. The software may be stored on a non-transitory storage medium (e.g., on a memory device). The searchable table extraction system 100 depicted in FIG. 1A is merely an example and is not intended to unduly limit the scope of embodiments. Many variations, alternatives, and modifications are possible. For example, in some implementations, the searchable table extraction system 100 may have more or fewer subsystems or components than those shown in FIG. 1A, may combine two or more subsystems, or may have a different configuration or arrangement of subsystems. The searchable table extraction system 100 and subsystems depicted in FIG. 1A may be implemented using one or more computer systems, such as the computer system depicted in FIG. 13.

As shown in FIG. 1A, the searchable table extraction system 100 also includes a storage subsystem 110 that may store the various data constructs and programs used by the searchable table extraction system 100. For example, the storage subsystem 110 may store various training datasets such as a base training dataset 112 and an enhanced training dataset 114. However, this is not intended to be limiting. In alternative implementations, the base training dataset 112 and/or the enhanced training dataset 114 may be stored in other memory storage locations (e.g., different databases) that are accessible to the searchable table extraction system 100, where these memory storage locations can be local to or remote from the searchable table extraction system 100. In addition to the training datasets, other data used by the searchable table extraction system 100 or generated by the searchable table extraction system 100 as a part of its functioning may be stored in the storage subsystem 110. For example, tables and information associated with tables that are extracted by the searchable table extraction system 100 may be stored in the storage subsystem 110.

Figure 1B:
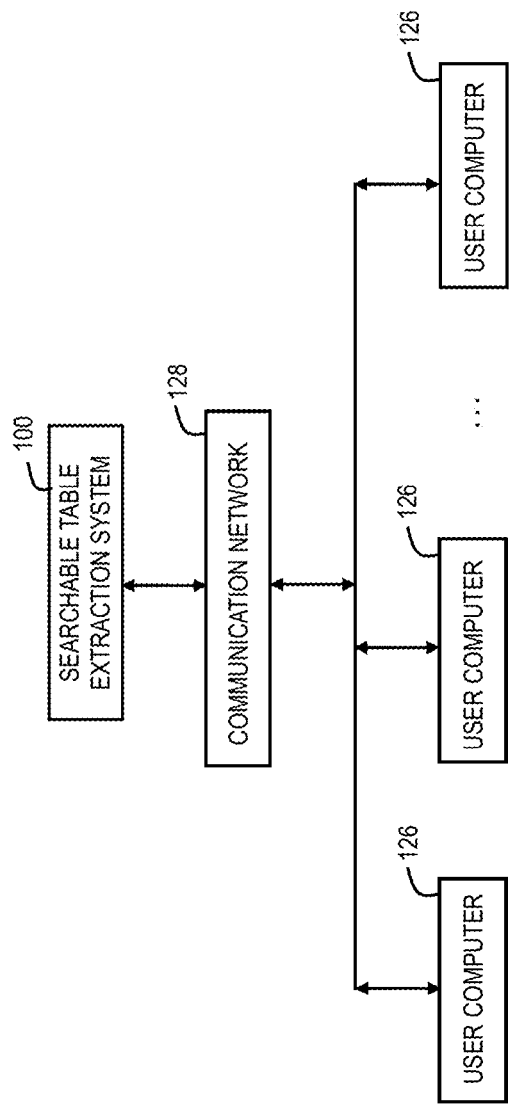
FIG. 1B is a simplified block diagram of a searchable table extraction system in a distributed computing environment according to various embodiments.
Figure 11:
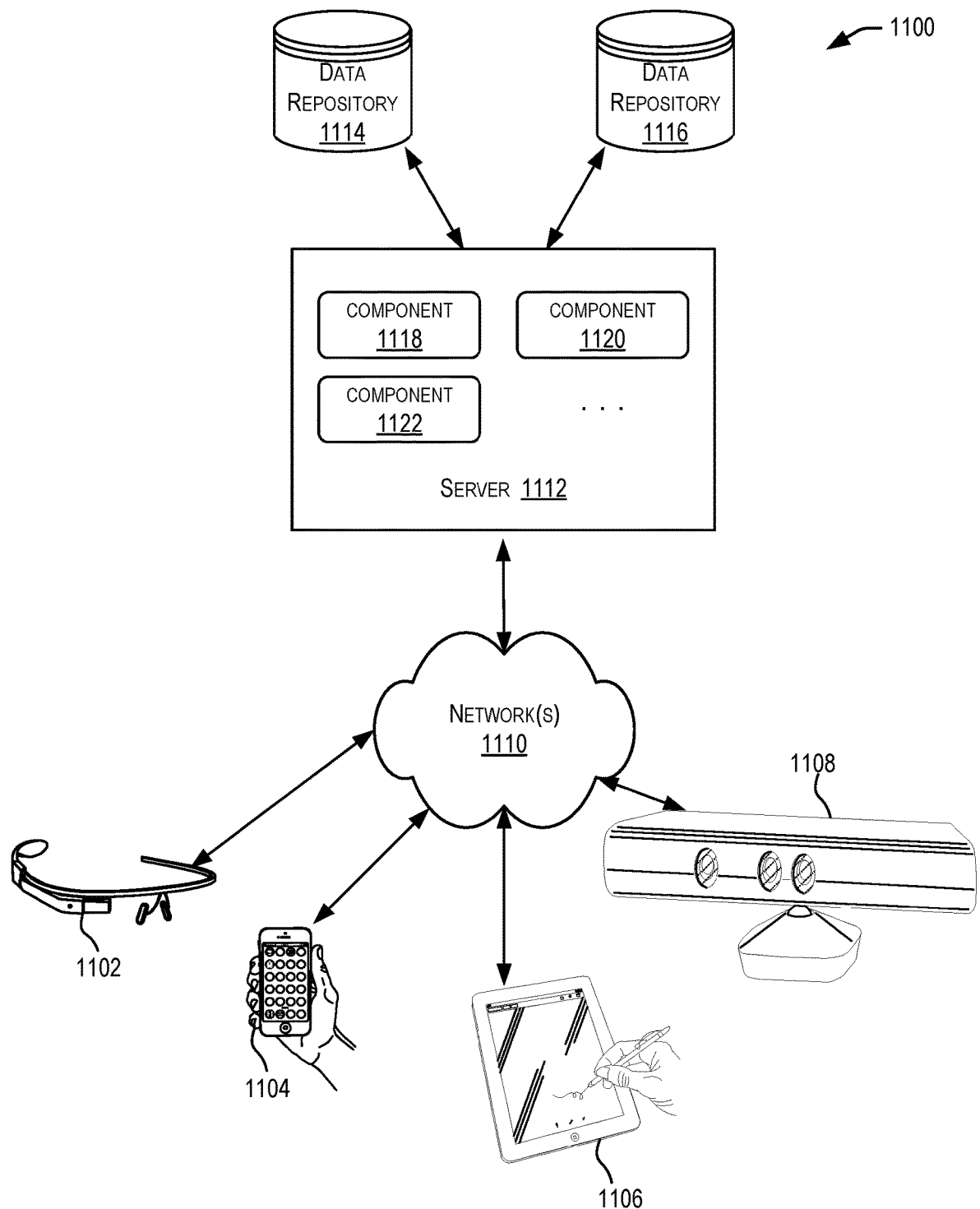
FIG. 11 depicts a simplified diagram of a distributed system for implementing various embodiments.

As shown in FIG. 1B, the searchable table extraction system 100 can be provided as a part of a distributed computing environment, where the searchable table extraction system 100 is connected to one or more user computers 126 via a communication network 128. An example of a distributed computing environment is depicted in FIG. 11 and described in detail below.

Figure 1C:
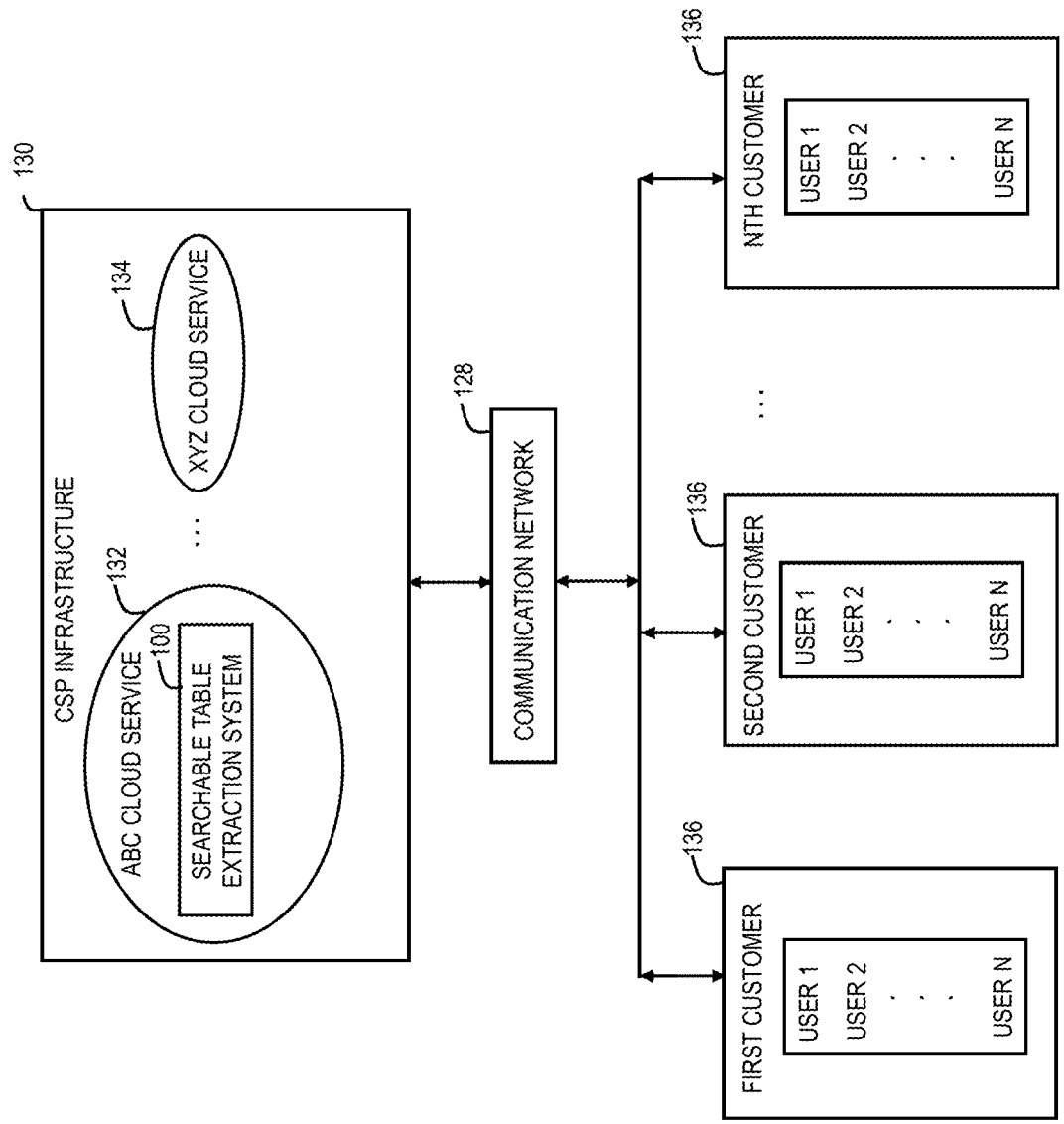
FIG. 1C is a simplified block diagram of a searchable table extraction system in a cloud service provider infrastructure according to various embodiments.

As shown in FIG. 1C, the searchable table extraction system 100 may be a part of a CSP infrastructure 130 provided by a CSP for providing one or more cloud services. For example, the one or more cloud services may include ABC cloud service 132 to XYZ cloud service 134 connected to computers of one or more customers 136 via a communication network 128. For example, the searchable table extraction system 100 may be a part of the ABC cloud service 132.

Figure 12:
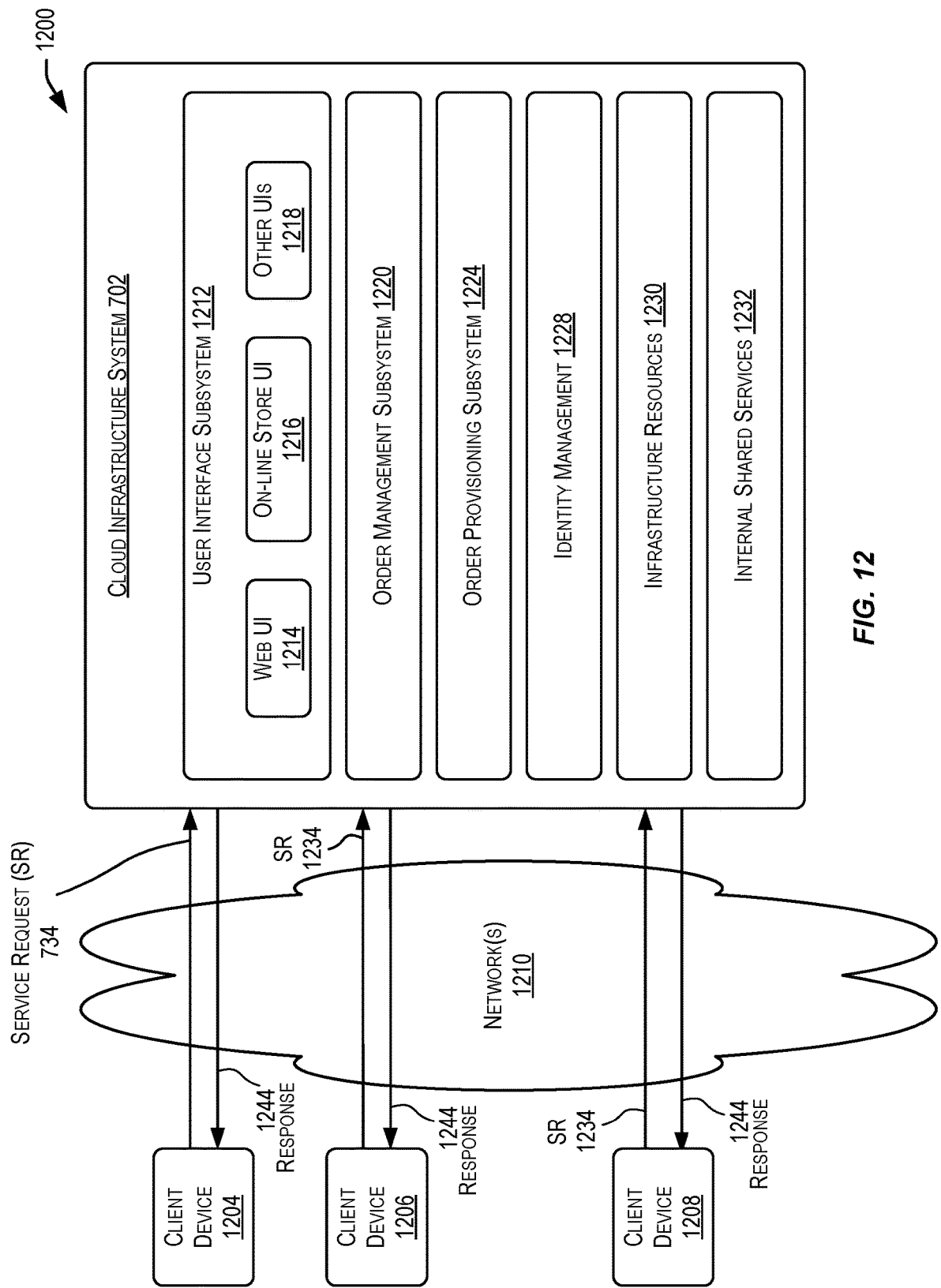
FIG. 12 is a simplified block diagram of one or more components of a system environment by which services provided by one or more components of an embodiment system may be offered as cloud services, in accordance with various embodiments.

An example of a cloud infrastructure architecture provided by the CSP is depicted in FIG. 12 and described in detail below.

The searchable table extraction system 100 is configured to perform multiple-stage processing. In the first processing stage, the searchable table extraction system 100 may perform training using historical document images that are differently processed and arranged as the base training dataset 112 and the enhanced training dataset 114. The training performed by the searchable table extraction system 100 at the first processing stage results in the generation of the table extraction model 140 capable of identifying and/or extracting any type of table, e.g., a table with two cells, a table with one cell, a table with multiple cells, a group table, a table having columns spanning across multiple rows, etc. The first processing stage can be performed by the training data generation subsystem 102 and the table extraction model generation subsystem 104.

In the second processing stage, the searchable table extraction system 100 may receive as an input, an input document image, extract one or more tables from the input document image, filter the tables, execute a query on the filtered tables, and provide an output as a result of the query. The second processing stage may be performed by the table extraction subsystem 105, the filtering subsystem 106, and the query executing subsystem 108.

Each of the first and second processing stages and the functions performed by the subsystems mentioned above are described below in more detail.

A. First Stage Processing

Figure 2A:
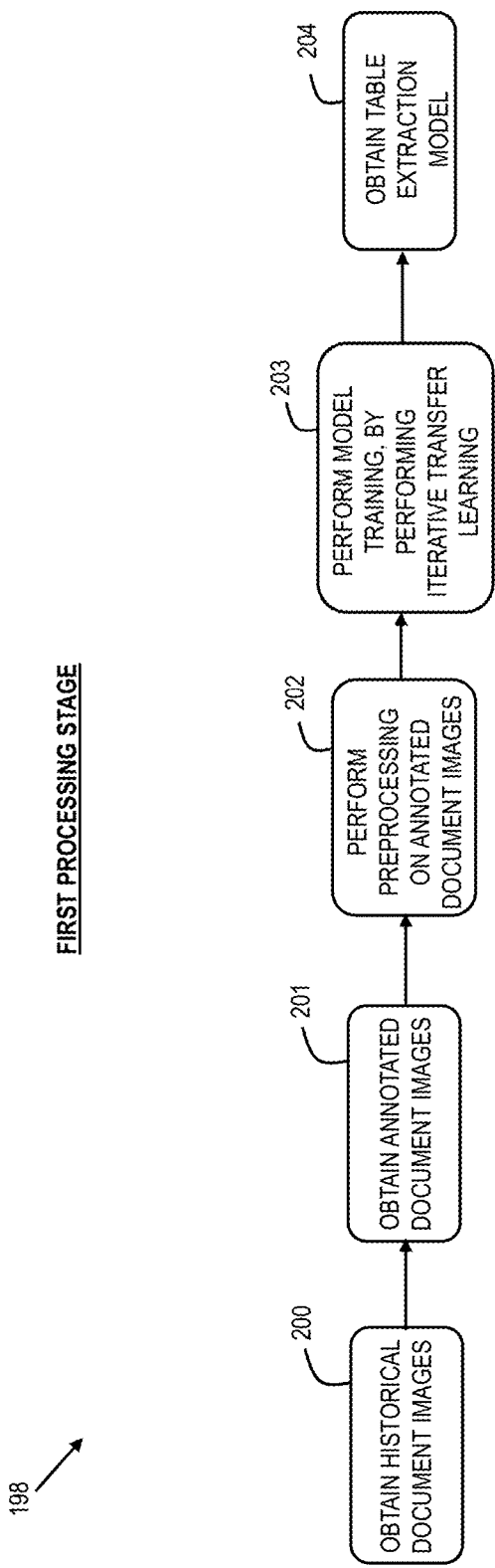
FIG. 2A is a flowchart of a method according to various embodiments.

FIG. 2A depicts processing corresponding to the first stage processing, according to embodiments. For example, the processing 198 depicted in FIG. 2A may be performed by the training data generation subsystem 102 and the table extraction model generation subsystem 104.

The processing 198 depicted in FIG. 2A may be implemented in software (e.g., code, instructions, program) executed by one or more processing units (e.g., processors, cores) of the respective subsystems, using hardware, or combinations thereof. The software may be stored on a non-transitory storage medium (e.g., on a memory device). The method presented in FIG. 2A and described below is intended to be illustrative and non-limiting.

Although FIG. 2A depicts the various processing operations occurring in a particular sequence or order, this is not intended to be limiting. In certain alternative embodiments, the processing 198 may be performed in some different order or some operations may be performed at least partially in parallel.

With continuing reference to FIG. 2A, at 200, the searchable table extraction system 100 can obtain the historical document images.

Examples of the historical document images include images of real-world documents, e.g., report of financial institution including stock performance statements, report of consumer agency providing an analysis customers' segments, etc. Each of the historical document images may include multiple pages that include text of variable format and tables including various data. However, this is not intended to be limiting, and the historical document images may include any applicable document where the table might be present.

At 201, the searchable table extraction system 100 can obtain the annotated document images. The annotated document images are described in detail below.

At 202, the searchable table extraction system 100 can preprocess the annotated document images. As a result of the operations performed at 201 and 202, the training data generation subsystem 102 is configured to output the base training dataset 112 and the enhanced training dataset 114.

Operations 200 to 202 are described in detail below in the section "Training Datasets Generation."

At 203, the searchable table extraction system 100 receives, as an input the base training dataset 112 and the enhanced training dataset 114, and performs model training by using the base training dataset 112 and the enhanced training dataset 114. For example, the table extraction model generation subsystem 104 utilizes iterative transfer learning. Transfer learning is the application of knowledge gained from completing one task (e.g., detecting objects in photographs) to help solve a different, but related, problem (e.g., identifying tables as objects within images of documents).

At 204, the searchable table extraction system 100 can output the trained model, as the table extraction model 140.

Operations 203 and 204 are described in detail below in the section "Extraction Table Model Generation."

1. Training Datasets Generation

As discussed above, the training data generation subsystem 102 can receive historical document images, perform certain processing on historical document images, and generate the base training dataset 112 and the enhanced training dataset 114.

FIG. 2B shows an example of the historical document image 208, e.g., a portion of the historical document image. As illustrated, the historical document image 208 includes text and a table 210 that does not have borders, e.g., a borderless table. The table 210 may be an object.

In some implementations, the processing performed by the training data generation subsystem 102 includes processing performed by an annotations subsystem 144 and a preprocessor 146.

The annotations subsystem 144 is configured to receive the historical document images, and obtain annotations to the historical document images.

In an example depicted in FIG. 1A, the annotations subsystem 144 receives the annotations to the historical document image from a user device 148, e.g., via a user input received through a user interface (UI) 150.

The annotations subsystem 144 provides the annotated document images, as an input, to the preprocessor 146. The preprocessor 146 preprocesses the annotated document images, and provides the preprocessed document images as first training datapoints of the base training dataset 112 and second training datapoints of the enhanced training dataset 114. The base training dataset 112 and the enhanced training dataset 114 are used by the table extraction model generation subsystem 104 to generate the table extraction model 140, and may be optionally stored in the storage subsystem 110.

In certain implementations, the processing performed by the training data generation subsystem 102 is performed in two phases. At the first phase, the annotations subsystem 144 obtains first annotated document images 152. The preprocessor 146 preprocesses the first annotated document images 152, and outputs the preprocessed first annotated document images as the first training datapoints of the base training dataset 112. At the second phase, the annotations subsystem 144 obtains second annotated document images 154. The preprocessor 146 preprocesses the second annotated document images 154, and outputs the preprocessed second annotated document images as the second training datapoints of the enhanced training dataset 114. The training data generation subsystem 102 performs processing at the first phase and the second phase partially in parallel, in parallel, or successively.

FIG. 2C shows the historical document image 208 of FIG. 2B that is obtained as a result of performing the processing at the first phase, e.g., the first annotated document image 152. The first annotated document image 152 is shown partially in FIG. 2C. As illustrated, a rectangular box 212, as a border, is drawn around the table 210, to signify an entirety of the table 210, and a tag 214 is provided as an annotation "table." E.g., the annotations categorize the content item as a table within the text of the historical document image 208 of FIG. 2B.

With reference again to FIG. 1A, the first annotated document images 152, which now have borders around the tables that are indicated by the annotation "table" to indicate tables within the text, are provided to the preprocessor 146. The preprocessor 146 is configured to perform pre-processing, to provide data augmentation for diversity of the training data. Data augmentation is a set of techniques to artificially increase the amount of training data by generating new datapoints from existing data. For example, the preprocessor 146 may apply one or more image augmentation techniques such as geometric transformations, color space transformations, blending of images, and the like to the same and/or different first annotated document image 152 to generate a plurality of different document images, e.g., a dilated image, a brightened image, a darkened image, an image rotated at different angles, a smudged image, etc.

The preprocessed first annotated document images 152 may be stored in the storage subsystem 110 as the base training dataset 112 that is used by the table extraction model generation subsystem 104 to generate a base model.

FIG. 2D shows the historical document image 208 of FIG. 2B that is obtained as a result of the processing performed at the second phase, e.g., the second annotated document image 154. The second annotated document image 154 is shown partially in FIG. 2C. As illustrated, the rectangular box 212 is drawn around the table 210, which is the same as in FIG. 2C. A tag 220 is provided as an annotation "unstructured table," and a plurality of tags 222 are provided as an annotation "cell." Also, the rectangular boxes 224 having four corners are drawn, as boundaries, around each identified cell. E.g., in the second phase, the annotations categorize the content item as an unstructured table and categorize the pieces of content items present in the table as cells.

With reference again to FIG. 1A, the second annotated document images 154, which have borders around each of the cells and tags that indicate the table as unstructured are provided to the preprocessor 146. E.g., of a structured table, no tag is provided. The preprocessor 146 is configured to perform pre-processing, to provide data augmentation for a diversity of the training data. For example, the preprocessor 146 may apply one or more image augmentation techniques such as geometric transformations, color space transformations, blending of images, and the like to the same and/or different second annotated document image 154 to generate a plurality of different document images, e.g., a dilated image, a brightened image, a darkened image, an image rotated at different angles, a smudged image, etc.

The preprocessed second annotated document images 154 may be stored in the storage subsystem 110 as the enhanced training dataset 114. The enhanced training dataset 114 may be used by the table extraction model generation subsystem 104 to generate the table extraction model 140.

2. Table Extraction Model Generation

The table extraction model generation subsystem 104, receives, as an input, a pretrained model, and trains the pretrained model using the base training dataset 112 and the enhanced training dataset 114, to generate the table extraction model 140, by applying training techniques such as iterative transfer learning.

In certain implementations, the training is broken up into two training stages. In a first training stage, a base model 158 is built by fine-tuning, e.g., training, a pretrained model for performing a first task (e.g., identifying and extracting a table from an image) using the base training dataset 112 that includes, as the first training datapoints, the preprocessed first annotated document images 152. The performing of the first task is related to an initial task that the pretrained model has been trained for performing, e.g., identifying objects within a photograph (i.e., object detection). The training at the first training stage may be performed by a base model training subsystem 160.

In a second training stage, the base model 158 is further fine-tuned, e.g., trained, for performing a second task (e.g., identifying and extracting an unstructured table and its individual components from a document image) using the enhanced training dataset 114 that includes, as the second training datapoints, the preprocessed second annotated document images 154. The performing of the second task is related to the first task and, as such, during transfer learning, knowledge is leveraged from the initial task and the first task to enrich learning in the second task. The output of the second training stage is the table extraction model 140. The training at the second training stage may be performed by a table extraction model training subsystem 164.

In the first training stage, the base model training subsystem 160 receives, as an input, a pretrained model 166 of a desired architecture. The base model training subsystem 160 then performs processing on the pretrained model 166 that results in the generation of a base model 158, which is output by the base model training subsystem 160. The output base model 158 is then used as an input for the second training stage performed by the table extraction model training subsystem 164.

In certain implementations, the pretrained model 166 is trained on ImageNet dataset that contains a collection of human annotated photographs. However, this is not intended to be limiting, and, in some implementations, the pretrained model 166 can be trained on generalized dataset that is able to identify objects. As a result of training, the pretrained model 166 is capable of identifying an object.

In some implementations, the architecture of the pretrained model 166 may be one of the architectures known to those skilled in the relevant art as being appropriate for the task. For example, a residual neural network (ResNet) model may be used for image classification tasks, a region-based convolutional neural network (RCNN) model may be used for object detection tasks, CNN, etc. In an embodiment, the pretrained model 166 is a CNN that is a two-stage detection model (D2Det) with a ResNet backbone. However, this is not intended to be limiting, and, in some implementations, the architecture of the pretrained model 166 may be a specialized architecture to support the training performed by the table extraction model generation subsystem 104.

As a part of the first training stage, the base model training subsystem 160 is configured to further receive an input from the base training dataset 112 and train the pretrained model 166 using the base training dataset 112.

In the course of the processing performed by the base model training subsystem 160, versions of the base model 158 are iteratively generated. For example, training performed by the base model training subsystem 160 may include several iterations, each iteration including a training phase and a validation phase. The training phase in each iteration results in the generation of a base model version. In the validation phase of the iteration, one or more performance metric(s) of the base model version are determined using the base training dataset 112. However, this is not intended to be limiting, and the validation phase may be performed after a certain number of iterations is performed at the training phase. As a part of the validation processing, the determined performance metric(s) are compared to the base model related performance threshold(s) that define the acceptable performance for the base model. The base model related performance threshold(s) may be provided by the user.

The training phase generally includes selecting hyperparameters for the model (e.g., the base model 158) and using an optimization algorithm (e.g., a stochastic gradient descent algorithm or a variant thereof such as batch gradient descent or minibatch gradient descent) to find the model parameters that correspond to the best fit between predicted and actual outputs. The hyperparameters are settings that can be tuned or optimized to control the behavior of the model. Most models explicitly define hyperparameters that control different aspects of the models such as memory or cost of execution. However, additional hyperparameters may be defined and optimized to adapt a model to a specific scenario. For example, the hyperparameters may include the number of hidden units of a model, the learning rate of a model, the convolution kernel width, the number of kernels for a model, the top-K results, N number of beam levels, and the like.

During training by the base model training subsystem 160, error is calculated as the difference between the actual output (e.g., as indicated by the annotations or labels) and the predicted output (e.g., as determined by the base model 158). The function that is used to compute this error is known as an objective function (e.g., a loss function or a cost function). Error is a function of internal parameters of the model, e.g., weights and bias. For accurate predictions, the error needs to be minimized. In order to minimize the error, the model parameters are incrementally updated by minimizing the objective function over the training datapoints from the base training dataset 112. The objective function can be constructed to measure the difference between the outputs inferred using the models and the ground truth annotated to the samples using the labels. For example, for a supervised learning-based model, the goal of the training is to learn a function "h( )" (also sometimes referred to as the hypothesis function) that maps the training input space X to the target value space Y, h: X→Y, such that h(x) is a good predictor for the corresponding value of y. Various different techniques may be used to learn this hypothesis function. In some machine learning algorithms such as a neural network, this is done using back propagation. The current error is typically propagated backwards to a previous layer, where it is used to modify the weights and bias values in such a way that the error is minimized. The weights are modified using the optimization function. Optimization functions usually calculate the error gradient, i.e., the partial derivative of the objective function with respect to weights, and the weights are modified in the opposite direction of the calculated error gradient. For example, techniques such as back propagation, random feedback, Direct Feedback Alignment (DFA), Indirect Feedback Alignment (IFA), Hebbian learning, and the like are used to update the model parameters in such a manner as to minimize or maximize this objective function. This cycle is repeated until a minima of the objective function is reached.

Once a set of model parameters is identified by the base model training subsystem 160, the base model 158 has been trained (e.g., one of the versions) and the base model training subsystem 160 is further configured to validate the base model 158 using validation datasets (e.g., a subset of the datapoints of the base training dataset 112). The validation process performed by the base model training subsystem 160 includes iterative operations of inputting the validating datasets into the trained base model 158 (e.g., one of the versions) using a validation technique such as K-Fold Cross-Validation, Leave-one-out Cross-Validation, Leave-one-group-out Cross-Validation, Nested Cross-Validation, or the like to tune the model parameters and ultimately find the optimal set of model parameters. Once the optimal set of model parameters is obtained, a reserved test set of data from the validating datasets are input into the trained base model 158 (e.g., one of the versions) to obtain output, and the output is evaluated versus ground truth values using correlation techniques such as Bland-Altman method and the Spearman's rank correlation coefficients and calculating performance metrics such as the error, accuracy, precision, recall, receiver operating characteristic curve (ROC), etc. In some instances, the obtaining, training, and validating data processes can be repeatedly performed (adjusted) by the base model training subsystem 160 until a predetermined condition is satisfied and a final set of model parameters can be provided by the base model training subsystem 160.

For example, the first training stage may continue until the base model related performance threshold(s) are satisfied, e.g., until the performance metric(s) determined for one of the base model versions meet the base model related performance threshold(s), e.g., within a range.

If the performance metric(s) determined for the base model version meet the base model related performance threshold(s), it indicates that the base model version has reached an acceptable level of performance. This may result in ending the first training stage and designating the base model version of a particular iteration, e.g., a last iteration, as the base model 158. The base model 158 may be provided to the table extraction model training subsystem 164.

As a result of the training performed by the base model training subsystem 160, the base model training subsystem 160 may provide, as an output, the base model 158 that is capable of identifying, e.g., predicting, the tables within the document images with high accuracy.

In an example shown in FIG. 2B, the historical document image 208 includes text 226 at the top side of the table 210 and text 228 at the bottom side of the table 210. Each of the text 226 and the text 228 may be considered to be a table. However, as a result of the training, the base model 158 can correctly identify the table 210 within the historical document image 208, even though the table 210, similarly to table-like texts 226 and 228, does not have borders. The table that is identifiable by the base model 158 can be any type of table, e.g., a table with two cells, a table with one cell, a table with multiple cells, a group table, a table having columns spanning across multiple rows, etc.

At the conclusion of the first training stage, the base model 158 may be stored in the storage subsystem 110 or in any other storage device usable by the searchable table extraction system 100.

The table extraction model training subsystem 164 is configured to perform training corresponding to the second training stage. The table extraction model training subsystem 164 receives the base model 158 as an input. The table extraction model training subsystem 164 then performs processing corresponding to the second training stage, which results in the generation of the table extraction model 140, which is then output by the table extraction model training subsystem 164.

Training performed by the table extraction model training subsystem 164 may include several iterations, each iteration including a training phase and a validation phase that may be performed similarly to the training phase and the validation phase that are described in detail above with respect to the base model training subsystem 160. The training phase in each iteration results in the generation of a table extraction model version based on the enhanced training dataset 114. In the validation phase of the iteration, one or more performance metric(s) of the table extraction model version are determined using the enhanced training dataset 114. Further, as a part of the validation processing, the determined performance metric(s) are compared to one or more performance thresholds configured for the second training stage, where the performance threshold(s) define the acceptable performance for the table extraction model. If the performance metric(s) determined for the table extraction model version meet the performance threshold(s) (e.g., within a range), it indicates that the table extraction model version has reached an acceptable level of performance. This may result in ending the second training stage and designating the table extraction model version as the table extraction model 140. In this manner, the base model 158 is iteratively trained using the enhanced training dataset 114 until a particular table extraction model version meets performance threshold(s) configured for the training performed by the table extraction model training subsystem 164. The particular table extraction model version may be output as the table extraction model 140.

As a result of the training performed by the table extraction model training subsystem 164, the table extraction model training subsystem 164 may provide, as an output, the table extraction model 140 that is capable of classifying the table as a structured table or an unstructured table, e.g., the table extraction model 140 can identify the structured table and the unstructured table. Additionally, the table extraction model 140 is capable of identifying cells within the tables. In some implementations, the table extraction model 140 may be stored in the storage subsystem 110 or in any other storage device usable by the searchable table extraction system 100.

FIG. 3 depicts processing performed by the searchable table extraction system 100 to obtain the table extraction model, according to embodiments. The processing 300 depicted in FIG. 3 may correspond to operations 200 to 204 of FIG. 2A. For example, the processing 300 depicted in FIG. 3 may be performed by the training data generation subsystem 102 and the table extraction model generation subsystem 104.

The processing 300 depicted in FIG. 3 may be implemented in software (e.g., code, instructions, program) executed by one or more processing units (e.g., processors, cores) of the respective subsystems, using hardware, or combinations thereof. The software may be stored on a non-transitory storage medium (e.g., on a memory device). The method presented in FIG. 3 and described below is intended to be illustrative and non-limiting.

Although FIG. 3 depicts the various processing operations occurring in a particular sequence or order, this is not intended to be limiting. In certain alternative embodiments, the processing 300 may be performed in some different order or some operations may be performed at least partially in parallel.

With continuing reference to FIG. 3, at 301, the searchable table extraction system 100 may obtain the base training dataset 112.

At 302, the searchable table extraction system 100 trains the pretrained model 166 using the base training dataset 112.

At 304, the searchable table extraction system 100 can obtain the base model 158.

At 305, the searchable table extraction system 100 may obtain the enhanced training dataset 114.

At 306, the searchable table extraction system 100 trains the base model 158 using the enhanced training dataset 114.

At 308, the searchable table extraction system 100 obtains the table extraction model 140.

B. Second Stage Processing

As described above, at the second processing stage, the searchable table extraction system 100 may receive as an input, an input document image, extract tables from the input document image, filter the tables, execute a query on the filtered tables, and provide an output as a result of the query.

Examples of the input document images include images of real-world documents, e.g., report of financial institution including stock performance statements, report of consumer agency providing an analysis customers' segments, etc. Each of the input document images may include multiple pages that include text of variable format and tables including various data. However, this is not intended to be limiting, and the input document images may include any applicable document where the table might be present.

FIG. 4 depicts processing corresponding to the second stage processing, according to embodiments. For example, the processing 400 depicted in FIG. 4 may be performed by all or some of the table extraction subsystem 105, the filtering subsystem 106, and the query executing subsystem 108.

The processing 400 depicted in FIG. 4 may be implemented in software (e.g., code, instructions, program) executed by one or more processing units (e.g., processors, cores) of the respective subsystems, using hardware, or combinations thereof. The software may be stored on a non-transitory storage medium (e.g., on a memory device). The method presented in FIG. 4 and described below is intended to be illustrative and non-limiting.

Although FIG. 4 depicts the various processing operations occurring in a particular sequence or order, this is not intended to be limiting. In certain alternative embodiments, the processing 400 may be performed in some different order or some operations may be performed at least partially in parallel.

With continuing reference to FIG. 4, at 412, the searchable table extraction system 100 may obtain one or more input document images.

At 414, the searchable table extraction system 100 may extract table(s) from the input document image using the table extraction model 140.

At 416, the searchable table extraction system 100 obtains criteria based on which the tables can be filtered, e.g., a keyword and a condition.

At 417, the searchable table extraction system 100 filters the tables based on a keyword and a condition, to exclude the tables that are of no interest to a user from the query search. That is, the filtering reduces the number of tables to be searched by the query.

At 418, the searchable table extraction system 100 obtains a query.

At 419, the searchable table extraction system 100 executes the query on filtered tables.

At 420, the searchable table extraction system 100 provides a result of the executed query as a JavaScript Object Notation (JSON) output.

Operations 412 to 420 of FIG. 4 are described below in more detail.

1. Table Extraction

As described above, the table extraction subsystem 105 may receive, as an input, the input document image, e.g., an image, a PDF document, etc. The input document image is passed through the table extraction model 140, e.g., a neural network model, that uses the object detection to detect tables, e.g., table coordinates, and the table classification to identify both bordered and borderless tables. The tables and the table information, e.g., table coordinates and table type, that are derived by the table extraction model 140 are used in postprocessing where the certain techniques are applied to extract more detailed information associated with the tables and the cell content. As a result of the processing performed by the table extraction subsystem 105, the table extraction subsystem 105 outputs tables in XML format containing texts of the cells and cell level information, e.g., cells' coordinates and architecture. As used herein, the cells' architecture refers to the cells arrangement within the table and corresponds to the table architecture. The tables with the texts serve as an input for the filtering subsystem 106.

The input document image can be any document image containing tables in any format or without a format. Although one input document image is described for convenience of description, this is not intended to be limiting. In some implementations, in order to obtain tables at the second processing stage, the table extraction model 140 can process a plurality of documents, partially in parallel, in parallel, or successively.

In an embodiment, the input document image may encompass multiple document images and can have any number of pages, e.g., 1, . . . 10, . . . , 100, . . . , 1000, . . . , 1,000,000, . . . etc., and may include one or more tables within the text, where at least one table is an object present in the input document image together with other content, e.g., text, images, logos, etc.

The table extraction model 140 performs processing on the input document image. As a result of the processing performed by the table extraction model 140, the table extraction model 140 identifies, extracts, and outputs all the tables present in the input document image. In an embodiment, a number of tables obtained by the table extraction model 140 may be any number, e.g., 1, . . . 10, . . . , 100, . . . , 1000, . . . , etc.

As a non-limiting example, the input document image may have 100 pages, and the table extraction model 140 may identify and output 100 tables.

FIG. 5A depicts a portion of an output 500 of the table extraction model 140. The table extraction model 140 may output tables in XML format. The XML file identifies cells 502 and coordinates 504 of the cells 502, e.g., coordinates of four corners of the box surrounding each cell (see FIG. 2D). The XML file also provides the coordinates of the tables. The tables 168 with coordinates may optionally be stored in the storage subsystem 110 or any other storage device usable by the searchable table extraction system 100.

With reference again to FIG. 1A, the table extraction subsystem 105 may further include a postprocessor 170. The postprocessor 170 receives, as an input, the tables 168 with coordinates in XML format that are output by the table extraction model 140, and applies postprocessing techniques on the tables 168 in XML format to extract text. As an example, postprocessor 170 uses an open source computer vision library (OpenCV) and an optical character recognition (OCR) tool, e.g., Python-tesseract capable of "reading" text embedded in the images and objects. As a result of the postprocessing performed by the postprocessor 170, the postprocessor 170 may output text corresponding to the cells using the coordinates provided by the table extraction model 140. The tables 172 with texts in the cell areas identified by coordinates may optionally be stored in the storage subsystem 110 or any other storage device usable by the searchable table extraction system 100.

As a result of the processing performed by the table extraction subsystem 105, the table information, e.g., the table type and architecture, and the cell level information, e.g., cell coordinates and content, are stored.

FIG. 5B depicts a portion of an output 510 of the postprocessor 170. As illustrated, the coordinates 504 shown in FIG. 5A are replaced with text 512 present in that area, e.g., in an area corresponding to a cell represented by the coordinates.

Figure 5C:
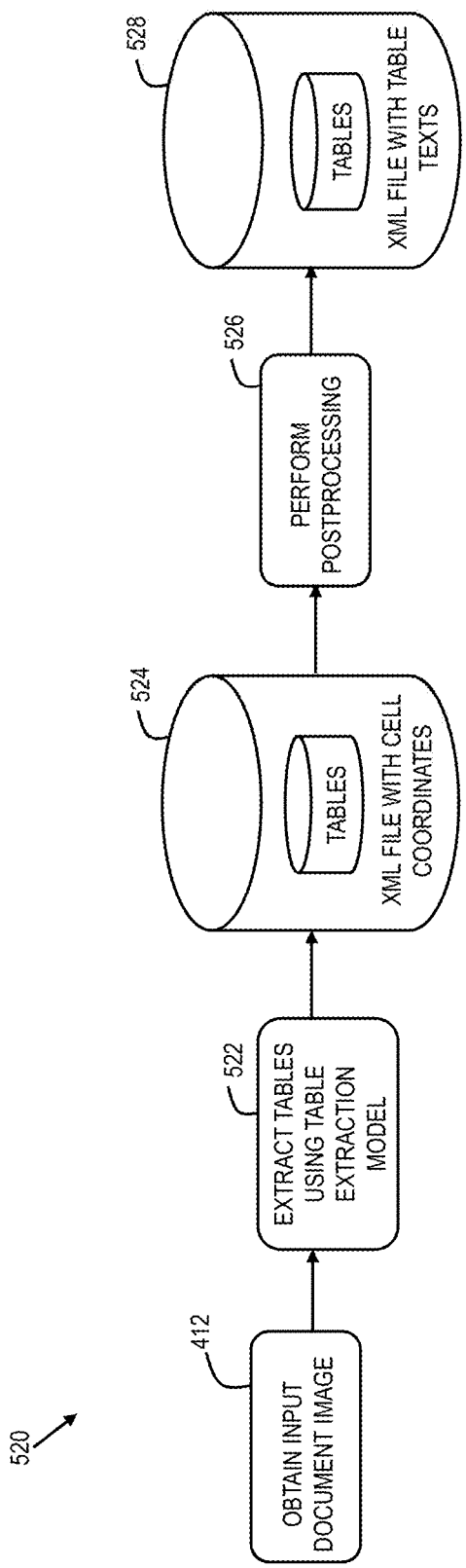
FIG. 5C is a flowchart of a method according to various embodiments.

FIG. 5C depicts processing performed by the table extraction subsystem 105, according to embodiments. For example, the processing 520 depicted in FIG. 5C may correspond to operations 412 and 414 of FIG. 4.

The processing 520 depicted in FIG. 5C may be implemented in software (e.g., code, instructions, program) executed by one or more processing units (e.g., processors, cores) of the respective subsystems, using hardware, or combinations thereof. The software may be stored on a non-transitory storage medium (e.g., on a memory device). The method presented in FIG. 5C and described below is intended to be illustrative and non-limiting.

Although FIG. 5C depicts the various processing operations occurring in a particular sequence or order, this is not intended to be limiting. In certain alternative embodiments, the processing 520 may be performed in some different order or some operations may be performed at least partially in parallel.

With continuing reference to FIG. 5C, at 412, the searchable table extraction system 100 may obtain one or more input document images.

At 522, the searchable table extraction system 100 may extract, from the input document image, tables in XML format with cells coordinates.

At 524, the searchable table extraction system 100 may optionally store the tables with coordinates, e.g., cells coordinates. In some embodiments, the tables 168 with coordinates can be stored in the storage subsystem 110 or any other storage device usable by the searchable table extraction system 100.

At 526, the searchable table extraction system 100 performs postprocessing on the extracted tables, to obtain tables in XML, format with text in the areas identified by the cell coordinates.

At 528, the searchable table extraction system 100 may optionally store the tables with the texts. In some embodiments, the tables 172 with the texts can be stored in the storage subsystem 110 or any other storage device usable by the searchable table extraction system 100.

2. Filtering

As described above, the filtering subsystem 106 receives, as an input, the tables 172 with the texts from the table extraction subsystem 105. The filtering subsystem 106 filters the tables using a filter to reduce a number of tables used in further processing based on predefined criteria. For example, the predefined criteria may include two parameters—one or more keywords and a condition. The filter of the filtering subsystem 106 uses two parameters to filter the tables 172. The first parameter is an array of keywords. The second parameter is composed of a binary array, as an input. The binary array can correspond to "AND" or "OR" condition. The filtering subsystem 106 allows the users to find all tables that match search criteria, e.g., the first parameter and the second parameter. As described in detail below, to handle the tables where the keyword spans across multiple cells, the filtering subsystem 106 uses the sub-keywords constructed based on the keyword and uses an initialized vector with a length equal to the number of keywords.

In an example depicted in FIG. 1A, the filtering subsystem 106 receives the keywords and condition via a user input received through the UI 150. However, this is not intended to be limiting. In some implementations, at least one of the keywords and the condition can be configured in advance and stored, e.g., in the storage subsystem 110 or any other storage device usable by the searchable table extraction system 100.

As an example, the table extraction subsystem 105 may identify and output 100 tables. The filtering subsystem 106 can receive, as input, the tables 172 output by the table extraction subsystem 105, and filter the tables, to obtain one or more tables having the content items of interest, e.g., the filtered tables 173. The filtered tables 173 having content items of interest that are obtained by the filtering subsystem 106 can be received as an input to the query executing subsystem 108, and may be optionally stored in the storage subsystem 110 or any other storage device usable by the searchable table extraction system 100.

In certain implementations, the filtering subsystem 106 includes a sub-keywords generator 174 and a vector generator 176. The sub-keywords generator 174 generates a sub-keywords list 178 based on the received keywords. In an embodiment, a condition received by the filtering subsystem 106 can be "AND" or "OR." The vector generator 176 generates a vector 180 based on the received keywords. A length of the vector is equal to a number of the keywords.

The filtering subsystem 106 may further include a filter 182. The filter 182 is configured to receive the sub-keywords of the sub-keywords list 178 and the condition, and filter the tables 172 based on the sub-keywords and the condition.

In an example, a number of the received keywords is 2. The vector generator 176 can generate the vector 180 as [0, 0] indicative that a number of keywords is 2. For the condition "YES," the filter 182 filters the tables 172 and outputs tables having both keywords. For the condition "OR," the filter 182 filters the tables 172 and outputs tables having at least one keyword.

However, the described above is not limiting. In some embodiments, different number of keywords and/or different vectors may be used. For example, if the number of keywords is 3, the vector 180 may be an array [0, 0, 0], etc.

For example, the keywords received by the filtering subsystem 106 include a first keyword "Price including GST" and a second keyword "Tax Deduction," and the condition received by the filtering subsystem 106 is "OR." Based on the received keywords, the vector generator 176 can generate the vector 180 as [0, 0]. Since the condition is "OR," the extracted table(s) must include at least one of the provided keywords, e.g., "Price including GST" or "Tax Deduction."

Based on "Price including GST" and "Tax Deduction," the sub-keywords generator 174 can generate the sub-keywords list 178 including the sub-keywords for each of the received keywords, as shown below in Table 1:

TABLE 1

| Keywords | Sub-keywords list |
|---|---|
| Price including GST | [Price, Price including, Price including GST] |
| Tax Deduction | [Tax, Tax deduction] |

Figure 6A:
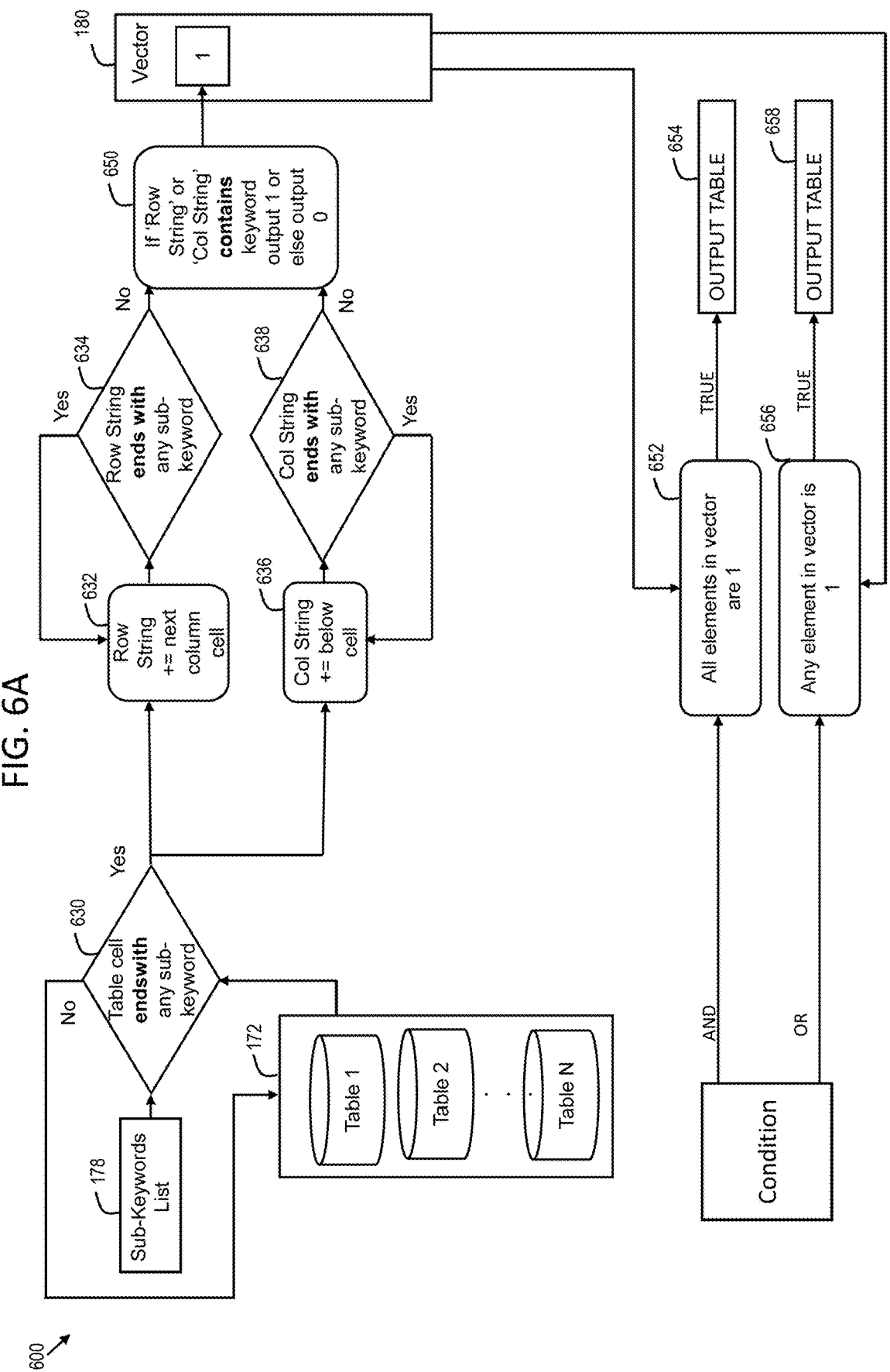
FIG. 6A is a flowchart of a method according to various embodiments.

FIG. 6A depicts an example of the processing performed by the filtering subsystem 106. For example, the processing 600 depicted in FIG. 6A may be performed by the filtering subsystem 106 and is described below in detail with reference to FIGS. 1A and 6B.

The processing 600 depicted in FIG. 6A may be implemented in software (e.g., code, instructions, program) executed by one or more processing units (e.g., processors, cores) of the respective subsystems, using hardware, or combinations thereof. The software may be stored on a non-transitory storage medium (e.g., on a memory device). The method presented in FIG. 6A and described below is intended to be illustrative and non-limiting.

Although FIG. 6A depicts the various processing operations occurring in a particular sequence or order, this is not intended to be limiting. In certain alternative embodiments, the processing 600 may be performed in some different order or some operations may be performed at least partially in parallel.

Figure 6B:
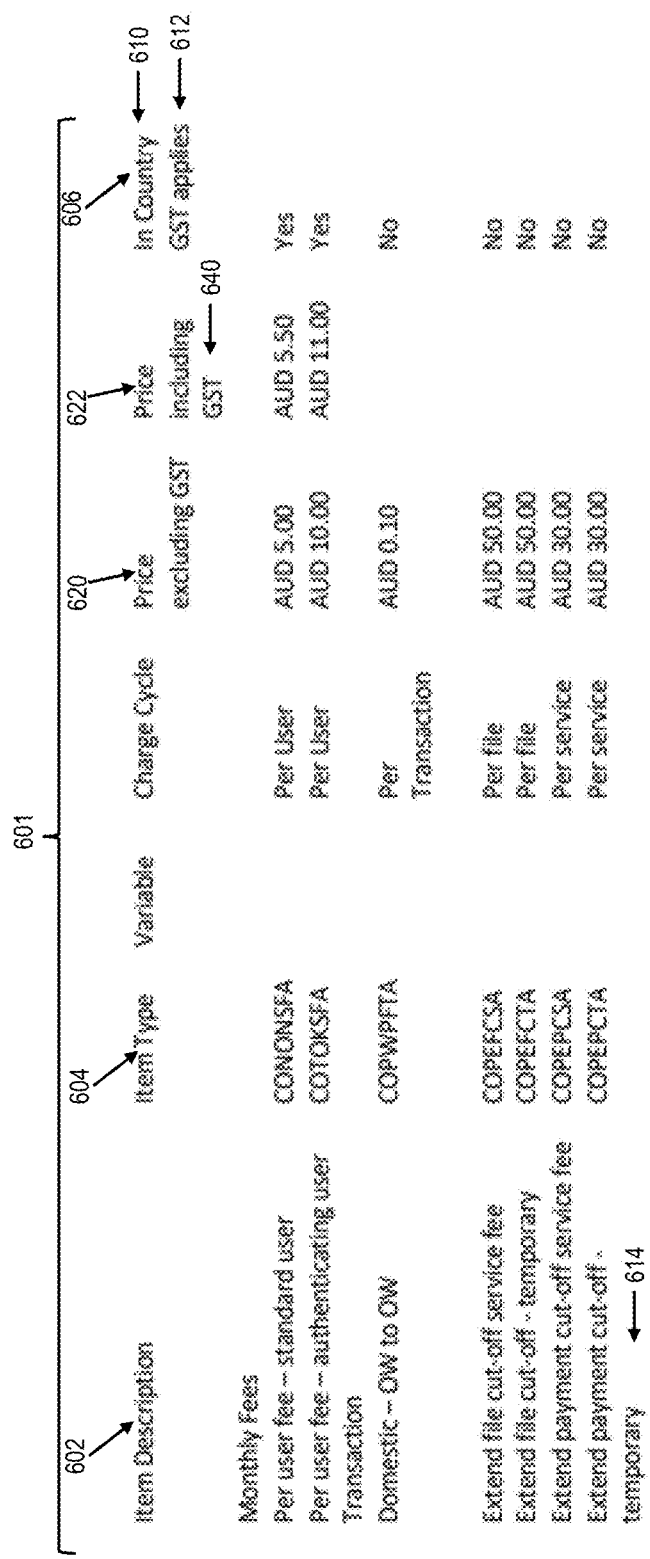
FIG. 6B illustrates an example of a table extracted by the table extraction model, according to various embodiments.

In an example of FIG. 6B, the table 601 includes a first column 602 and a second to an Nth column 604 to 606. The table 601 also includes a first row 610 and a second to an Mth row 612 to 614.

With continuing reference to FIG. 6A, at 630, the filter 182 may traverse the table starting with the first column and proceeding the first row toward the last column. E.g., in FIG. 6B, the filter 182 may traverse the table 601 starting with the first column 602 and proceeding along the first row 610 toward the Nth column 606.

The filter 182 then may determine whether any of the table cells in the first row ends with any sub-keyword.

If, at operation 630, it is determined that the table cell in the first row ends with a sub-keyword, the processing 600 proceeds to 632 and/or 636.

If, at operation 630, it is determined that no table cell in the first row ends with a sub-keyword, the processing 600 of the current table ends, and a next table is retrieved from the storage subsystem 110.

For example, in the first row 610 of FIG. 6B, the filter 182 may identify a first sub-keyword "Price" as a text of the table cell in an (N-2) column 620 and an (N-1) column 622.

Accordingly, at 630, it is determined that two table cells end with the first sub-keyword "Price," and the processing proceeds to 632 and 636.

At 632, the filter 182 may traverse the table 601 along the first row 610 starting with the (N-2) column and proceeding toward the last column. The filter 182 may extract a string "price," a string "price price," and a string "price in country."

At 634, it is determined that none of the strings ends with a second keyword "Price including," and the traversal along the row direction ends.

At 636, the filter 182 may traverse the table along the columns where the first sub-keyword is identified. E.g., in FIG. 6B, the filter 182 may traverse the (N-2) column 620 in a direction from the first row 610 to the Mth row 614, thereby obtaining a string "Price excluding GST." The filter 182 also may traverse the (N-1) column 622 in a direction from the first row 610 to the Mth row 614, thereby obtaining a string "Price including."

At 638, it is determined that the string "Price including" ends with the second sub-keyword, e.g., "Price including," and the processing 600 returns to operation 636. At this iteration of operation 636, the filter 182 traverses the table along the column where the second sub-keyword is identified. E.g., in FIG. 6B, the filter 182 traverses the (N-1) column 622 in a direction from the second row 612 to the Mth row 614, thereby obtaining a string "Price including GST."

Next, at 638, it is determined that string "Price including GST" ends with a third sub-keyword, e.g., "Price including GST," and the processing 600 returns to operation 636. At this iteration of operation 636, the filter 182 traverses the table along the column where the third sub-keyword is identified. E.g., in FIG. 6B, the filter 182 traverses the (N-1) column 622 in a direction from a third row 640 to the Mth row 614, thereby obtaining a string "Price including GST AUD 5.50."

At 638, it is determined that string "Price including GST AUD 5.50" does not end with any sub-keyword from the provided sub-keywords list 178, and the processing 600 proceeds to 650.

At 650, the filter 182 may output a value 1 associated with the table 601 for the vector 180.

The processing 600 then returns to operation 630 to scan the table for the second keyword, e.g., "Tax Deduction." In the table 602 of FIG. 6B, "Tax Deduction" is not present. Accordingly, as a result of operations 630 to 638, the filter 182 may output a value 0 associated with the table 601 for the vector 180 (operation 650).

If the condition received by the filtering subsystem 106 is AND, then in operation 652 it is determined if the elements of the array of the vector 180 are all equal to 1. In this case, the table is output by the filtering subsystem 106 (operation 654).

If the condition received by the filtering subsystem 106 is OR, then in operation 656 it is determined if any element of the array of the vector 180 is equal to 1. The vector may be [0, 1] if the second keyword is found and [1, 0] is the first keyword is found.

If the vector is [0, 1], [1, 0], or [1, 1], the table is output by the filtering subsystem 106 (operation 658).

After processing one table, the processing returns to operation 630 to process next table.

Continuing with the example of the received condition OR and the table 601, since the vector [1, 0] is returned by the filter 182, the table 601 is output by the filtering subsystem 106, e.g., the filtered table 173. The query executing subsystem 108 receives the filtered tables and executes a query, as described in detail below.

Using the filtering subsystem 106, the tables are filtered out based on the customer's interest expressed in terms of keywords, and a great number of tables, e.g., 100 tables, can be filtered down to a much smaller number of table, e.g., few tables, such as 3, using the keywords and condition.

However, the described-above is not limiting. In some embodiments, the filter 182 may be capable of obtaining the table having only some of the words of the keyword, e.g., "Price GST," or having sub-keywords with incorrect spelling.

3. Executing Query

As described above, the query executing subsystem 108 receives the filtered tables 173 and executes a customer's query, where the query executing subsystem 108 has the ability to derive grammar and rules for constructing a machine-readable query structure specific to a particular table of the input document image. As a result of the query execution, the values of the table can be searched for, extracted, and output.

a. Query

As mentioned above, in various embodiments, the constructed query is an SQL-like query. The SQL has a statement SELECT that can retrieve records from a table according to clauses, e.g., FROM and WHERE. For example, the SQL query may be "SELECT column1, column2 FROM table1, table2 WHERE column2='value'."

In certain implementations, the novel query may be constructed in a specialized form using Topology Query Language (TQL) keys.

In various embodiments, some of the tables that are extracted might not have headers limited to a single cell. Also, the table can have hierarchical headers. Accordingly, the keys are defined so that a query can be conducted on any table. In certain implementations, the keys have the following properties:

Keys are to be available at the top of the table or at the left column of the table. For example, the cells on the top of the table and at the left column are key cells, and all other cells are data cells.

Keys can span across multiple rows and columns.

The table headers could have spaces or other punctuations, and the keys can include spaces or other punctuations in the query by using quotation marks.

The information of headers and sub-headers is captured using a composite key that is defined based on the parent-child relationship. The syntax of the composite key is Key1.Key2 where Key1 is the parent key (header) and Key2 is the child key (sub-header).

b. Table Query Parser Engine

In certain implementations, the query executing subsystem 108 may include a table query parser engine 184. The table query parser engine 184 is configured to receive, as an input, one or more filtered tables 173 and the information associated with the filtered tables 173, e.g., table information and cell level information. As described above, the table information may include table coordinates and table type. The cell level information may include cells' coordinates and cells' architecture.

Based on the received table information and cell level information, the table query parser engine 184 is configured to generate grammar and rules 185 specific to the table. The table query parser engine 184 can identify the boundaries of the cells using cells' coordinates provided by the table extraction model 140 and map cells' coordinates to appropriate keys and values. As an example, the table query parser engine 184 can classify the cells on the top of the filtered table 173 and at the left column as the key cells, and all other cells as the data cells. As another example, the table query parser engine 184 can identify nested tables and correctly classify the cells containing headers and sub-headers as the key cells. E.g., the table query parser engine 184 can determine parent-child relationship of the cells.

The table query parser engine 184 is further configured to receive, as an input, a query from a customer, and perform certain processing on the query based on the grammar and rules 185. Based on the grammar and rules 185, the table query parser engine 184 can construct and execute the query on the filtered table 173. The grammar and rules are described below in more detail with reference to FIG. 7B.

In various embodiments, the table query parser engine 184 splits the query into tokens. Then, the table query parser engine 184 checks the tokenized query for syntax. During this phase, the table query parser engine 184 constructs a parse tree to check for syntactical errors. After the parse tree is constructed, semantic analysis is performed where the table query parser engine 184 checks the query, e.g., the parse tree, for grammatical or semantic errors. After being analyzed semantically, the query is executed in an orderly manner based on the defined tree structure. As described above, the searchable table extraction system 100 provides SQL-like queries to simplify the table access.

In certain implementations, the table query parser engine 184 can include a tokenizer 186. The tokenizer 186 receives, as an input, a query, and provides, as a tokenization output, a tokenized query where the query is converted to syntaxes, e.g., tokens. The tokenizer 186 can tokenize the query to obtain tokens, e.g., data manipulation language (DML), keywords, identifier of the table, etc.

For example, the tokenizer 186 may receive a query "SELECT*FROM Table." Based on query "SELECT*FROM Table," the tokenizer 186 can provide a tokenization output as follows:

[<DML 'select' at 0x1EA9AA44A00>, <Whitespace "at 0x1EA9AA44B80>, <Wildcard '*' at 0x1EA9AA44E20>, <Whitespace" at 0x1EA9AA44E80>, <Keyword 'from' at 0x1EA9AA44EE0>, <Whitespace "at 0x1EA9AA44F40>, <Identifier 'table' at 0x1EA9AA34BA0>]

In some embodiments, the table query parser engine 184 can check the tokenized query for semantics and correct syntactical mistakes.

For example, the table query parser engine 184 includes a parse tree generator 188 and a semantic analyzer 190.

The parse tree generator 188 is configured to receive, as an input, the tokenized query, and construct a parse tree based on the syntaxes of the tokenized query. For example, the syntaxes in the query "SELECT*FROM Table" include [SELECT, *, FROM, Table].

Figure 7A:
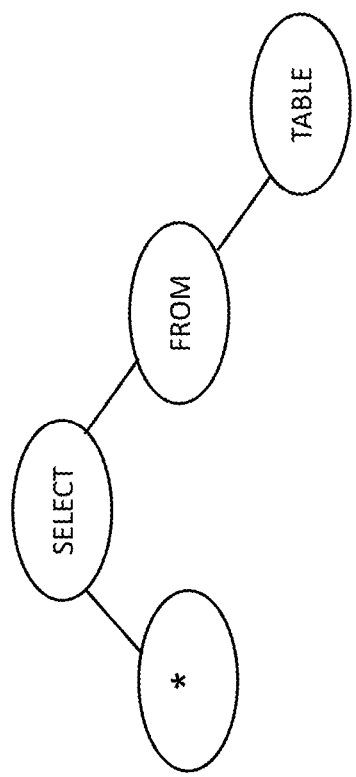
FIG. 7A depicts an example of a parse tree according to various embodiments.

FIG. 7A depicts a parse tree that may be constructed by the parse tree generator 188, according to various embodiments.

The parse tree 700 depicted in FIG. 7A is constructed based on a query "SELECT*FROM Table."

The semantic analyzer 190 can perform the semantic analysis on the parse tree 700, to identify grammatical, syntactical, and/or or semantic errors, e.g., abnormalities. Here, all the unknown names are resolved, and aggregates are determined if present. In some embodiments, the semantic analyzer 190 corrects and/or optimizes identified abnormalities, and outputs an optimized parse tree.

With continuing reference to FIG. 1A, the table query parser engine 184 includes a query executor 192. The query executor 192 is configured to receive, an input, the optimized parse tree containing the query. The query executor 192 can execute the query on the table in an orderly manner based on the defined parse tree structure.

Figure 7B:
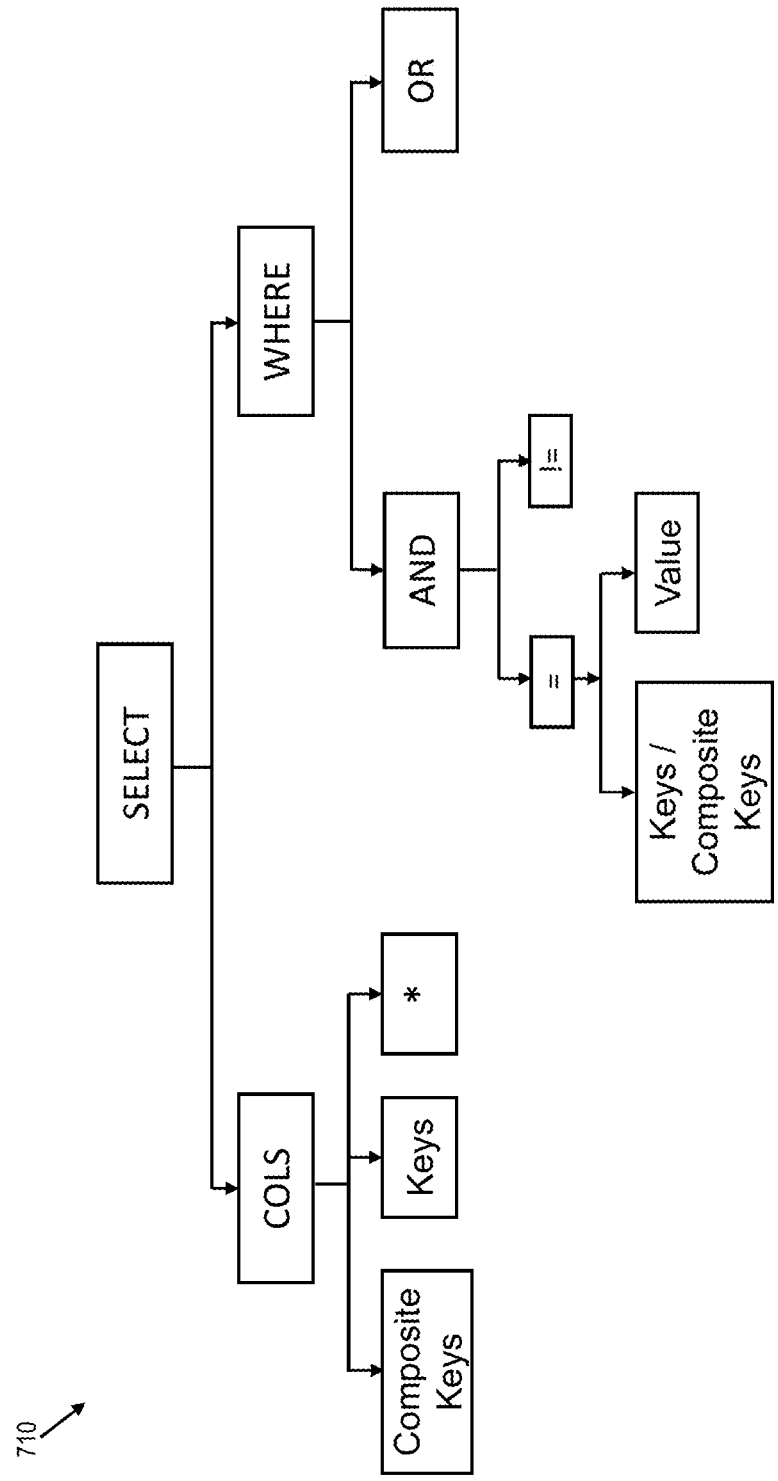
FIG. 7B depicts an example of a parse tree according to various embodiments.

FIG. 7B depicts a parse tree 710, according to various embodiments.

The query executor 192 can execute the query using the parse tree 710. As shown in FIG. 7B, the parse tree 710 starts with "SELECT" and branches out to "Columns" and "WHERE." "Columns" can branch out to "composite keys," "keys," and "*". The "*" means to select all columns. "WHERE" branches out to a condition "AND" and a condition "OR." "AND" branches out to equal ("=") and not equal "!=". Finally, the equal branches out to "Keys/composite keys" and "value." The parse tree 710 represents the query grammar and the order of execution, e.g., corresponding to the grammar and rules 185.

In certain implementations, the query executor 192 includes a row selector 194 and a column selector 196. The row selector 194 may select a row index based on the query, and extract one or more content items of at least one cell corresponding to the row index. The column selector 196 may select a column index based on the query, and extract one or more content items of at least one cell corresponding to the column index.

As a result of executing the query, the query executor 192 may provide a JSON output corresponding to content items extracted from the table.

Figure 8A:
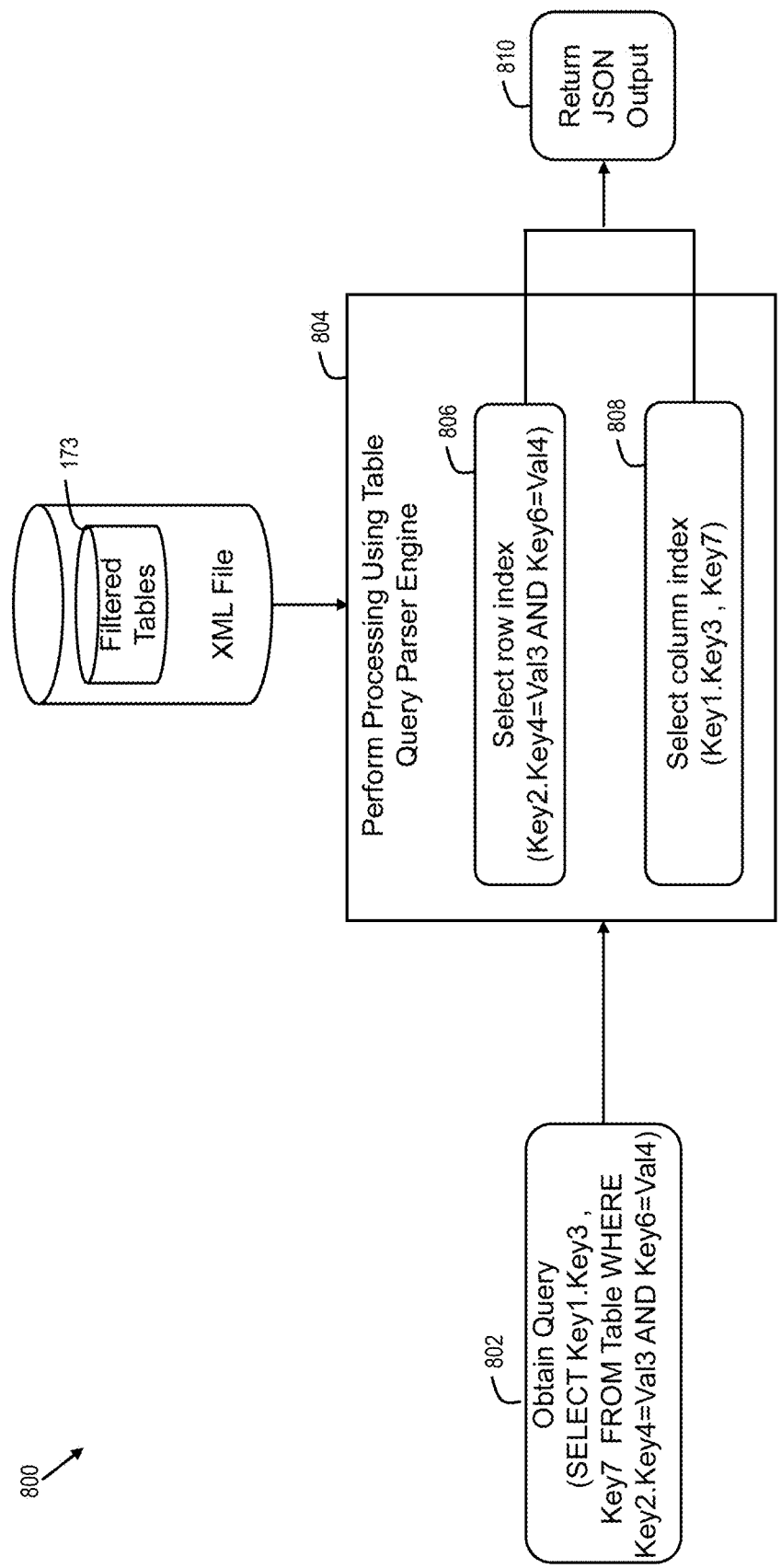
FIG. 8A is a flowchart of a method according to various embodiments.

FIG. 8A depicts a processing performed by the query executing subsystem 108, according to embodiments.

The processing 800 depicted in FIG. 8A may be implemented in software (e.g., code, instructions, program) executed by one or more processing units (e.g., processors, cores) of the respective subsystems, using hardware, or combinations thereof. The software may be stored on a non-transitory storage medium (e.g., on a memory device). The method presented in FIG. 8A and described below is intended to be illustrative and non-limiting.

Although FIG. 8A depicts the various processing operations occurring in a particular sequence or order, this is not intended to be limiting. In certain alternative embodiments, the processing 800 may be performed in some different order or some operations may be performed at least partially in parallel.

At 802, the query executing subsystem 108 may obtain the query. For example, the query may be:

"SELECT Key1.Key3, Key7 FROM Table WHERE Key2.Key4=Val3 AND Key6=Val4."

At 804, the query executing subsystem 108 can perform processing on the query. "SELECT" signals the beginning of the query and "WHERE" breaks the query into two parts. The part to the left of "WHERE" represents the column selection and the part to the right of "WHERE" represents the row selection. The syntax "FROM table" is ignored.

At 806, the query executing subsystem 108 selects the row index. In the example of the above query, the selected row index may be "Key2.Key4=Val3 AND Key6=Val4." The condition "AND" indicates that both conditions need to be satisfied and the value is to be retrieved at the intersection of the rows that are on both sides of the condition.

At 808, the query executing subsystem 108 selects the column index. In an example, the selected column index may be "SELECT Key1.Key3, Key7."

At 810, the query executing subsystem 108 may provide an output of the query as the JSON output.

FIG. 8B depicts portion of the processing performed by the table query parser engine 184, according to embodiments. The processing 820 depicted in FIG. 8B may correspond to some or all of some of the operations 804 to 808 of FIG. 8A.

The processing 820 depicted in FIG. 8B may be implemented in software (e.g., code, instructions, program) executed by one or more processing units (e.g., processors, cores) of the respective subsystems, using hardware, or combinations thereof. The software may be stored on a non-transitory storage medium (e.g., on a memory device). The method presented in FIG. 8B and described below is intended to be illustrative and non-limiting. Although FIG. 8B depicts the various processing operations occurring in a particular sequence or order, this is not intended to be limiting. In certain alternative embodiments, the processing 820 may be performed in some different order or some operations may be performed at least partially in parallel.

At 822, the table query parser engine 184 may tokenize the query.

At 824, the table query parser engine 184 may generate the parse tree.

At 826, the table query parser engine 184 may perform semantic analysis and binding. Binding is used to create placeholders for actual values in SQL statements. It is used by the table query parser engine 184 to pass variables inside SQL statement to be replaced later with actual value.

At 828, the table query parser engine 184 may execute the query.

c. Examples of Queries and Queries' Outputs

As an example, the table may be Table 2 shown below and a query may be "SELECT Key3 FROM table."

TABLE 2

| Key1 | Key2 | | Key3 | |
| --- | --- | --- | --- | --- |
| Val1 | Key4 | Key5 | Key4 | Key5 |
| Val2 | Val3 | Val4 | Val5 | Val6 |
|  | Val7 | Val8 | Val9 | Val10 |
| Val11 | Val12 | Val13 | Val14 | Val15 |
|  | Val16 | Val17 | Val18 | Val19 |

In the query "SELECT Key3 FROM table," the key "Key3" after "SELECT" instructs the table query parser engine 184 to extract the column having a header Key3. The output of the query "SELECT Key3 FROM table" may be JSON representation of Table 3 having two columns with a header "Key3."

TABLE 3

| Key3 | |
| --- | --- |
| Key4 | Key5 |
| Val5 | Val6 |
| Val9 | Val10 |

TABLE 3-continued

| Key3 | |
|---|---|
| Key4 | Key5 |
| Val14 | Val15 |
| Val18 | Val19 |

As another example, the table may be Table 2 shown above and a query may be "SELECT Key3.Key5 FROM table." The query has a composite key "Key3.Key5" after "SELECT" that instructs the table query parser engine 184 to extract the column having a header Key3 and a sub-header Key5. Accordingly, the query return may be JSON representation of Table 4 shown below.

TABLE 4

| Val6 |
|---|
| Val10 |
| Val15 |
| Val19 |

As yet another example, the table may be Table 2 shown above and a query may be "SELECT*FROM table WHERE Key1=Val11." The condition Key1=Val11 after "WHERE" instructs the table query parser engine 184 to extract one or more values in the row Val11 located in a column with a header Key 1. The "*" in the query after "SELECT" instructs the table query parser engine 184 to select the values in all columns of the row Val11. Accordingly, the query return may be JSON representation of Table 5 shown below.

TABLE 5

| Val11 | Val12 | Val13 | Val14 | Val15 |
|---|---|---|---|---|
| | Val16 | Val17 | Val18 | Val19 |

As yet another example, the table may be Table 2 shown above and a query may be "SELECT Key3.Key5 FROM table WHERE Key2.Key5=Val4." The composite keyword Key2.Key5=Val4 after "WHERE" instructs the table query parser engine 184 to extract one or more values in the row where Val4 is located in a column with a header Key2 and a sub-header Key5. The composite key "Key3.Key5" in the query after "SELECT" instructs the table query parser engine 184 to select the values in the column with a header Key3 and a sub-header Key5. Accordingly, the output of the query may correspond to "Val6."

III. Methods

Figure 9:
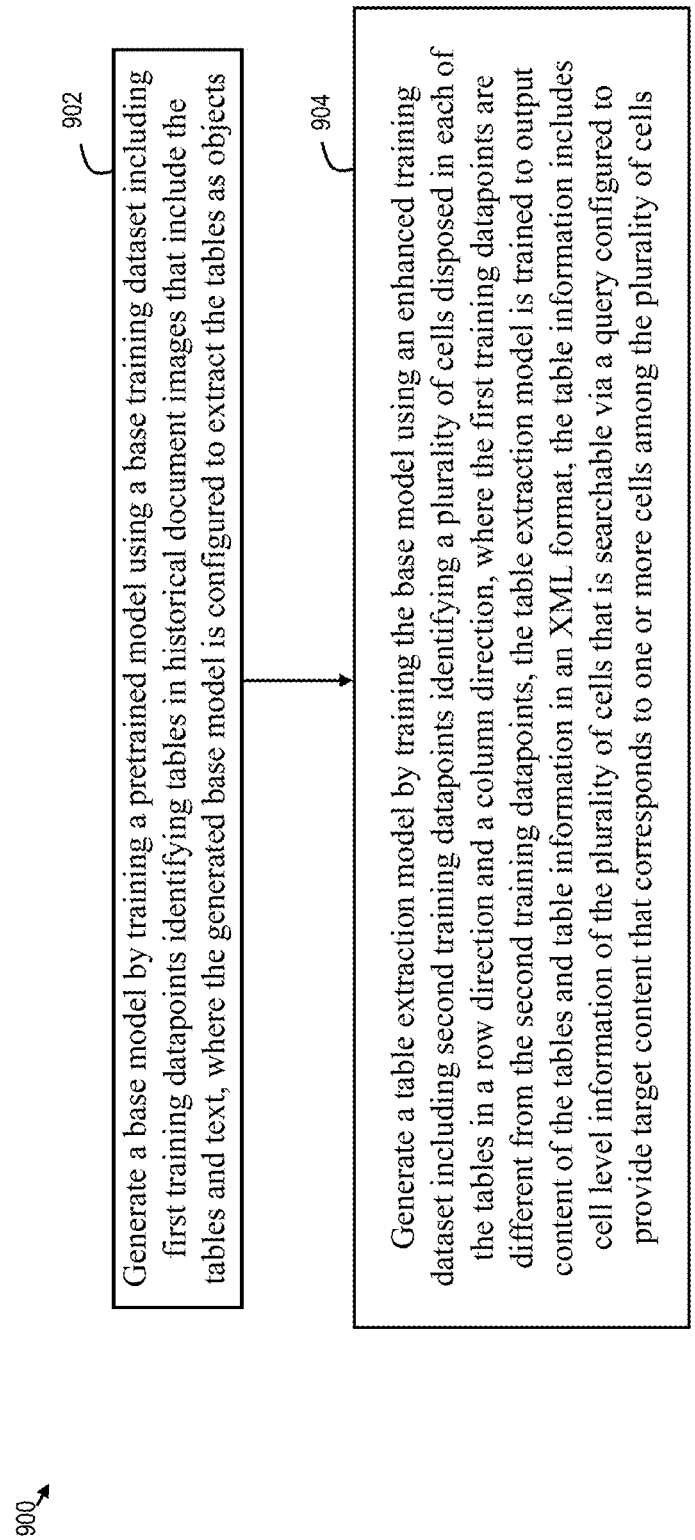
FIG. 9 depicts processing performed by the searchable table extraction system according to various embodiments.

FIG. 9 depicts processing according to various embodiments. For example, the processing 900 depicted in FIG. 9 may be performed by all or some of the training data generation subsystem 102, the table extraction model generation subsystem 104, the table extraction subsystem 105, the filtering subsystem 106, and the query executing subsystem 108.

The processing 900 depicted in FIG. 9 may be implemented in software (e.g., code, instructions, program) executed by one or more processing units (e.g., processors, cores) of the respective subsystems, using hardware, or combinations thereof. The software may be stored on a non-transitory storage medium (e.g., on a memory device). The method presented in FIG. 9 and described below is intended to be illustrative and non-limiting. Although FIG. 9 depicts the various processing operations occurring in a particular sequence or order, this is not intended to be limiting. In certain alternative embodiments, the processing 900 may be performed in some different order or some operations may be performed at least partially in parallel.

With continuing reference to FIG. 9, at 902, the searchable table extraction system 100 generates a base model by training a pretrained model using a base training dataset including first training datapoints identifying tables in historical document images that include the tables and text, where the generated base model is configured to extract the tables as objects.

The pretrained model is a CNN pretrained model configured to extract objects from images, and the base model is a CNN-based model enhanced from the CNN pretrained model to extract tables as objects from document images.

The searchable table extraction system 100 generates first annotated document images based on the historical document images, the first annotated document images including annotations indicating borders surrounding the tables, respectively, and tags indicating content within each of the borders to be a table. The searchable table extraction system 100 preprocesses the first annotated document images to generate augmented first annotated document images, and trains the pretrained model using the augmented first annotated document images, which serve as the first training datapoints of the base training dataset.

The searchable table extraction system 100 performs the preprocessing on the first annotated document images by performing at least one image-processing technique from among brightening, darkening, rotating, dilating, and smudging.

At 904, the searchable table extraction system 100 generates a table extraction model by training the base model using an enhanced training dataset. The enhanced training dataset includes second training datapoints that are different from the first training datapoints and identify a plurality of cells disposed in each of the tables in a row direction and a column direction. The table extraction model is trained to output content of the tables and table information in an XML format, where the table information includes cell level information of the plurality of cells that is searchable via a query. The query is configured to provide target content that corresponds to one or more cells among the plurality of cells.

The searchable table extraction system 100 generates second annotated document images based on the first annotated document images, the second annotated document images including annotations indicating a table type, borders surrounding the plurality of cells, respectively, and tags indicating content within the borders surrounding the plurality of cells to correspond to a cell, where the table type is a structured table or an unstructured table. The searchable table extraction system 100 preprocesses the second annotated document images to generate augmented second annotated document images, and trains the base model using the augmented second annotated document images, which serve as the second training datapoints of the enhanced training dataset.

The searchable table extraction system 100 performs the preprocessing on the second annotated document images by performing at least one image-processing technique from among brightening, darkening, rotating, dilating, and smudging.

The table extraction model is configured to output the table information including a table type and table coordinates, and output the cell level information including coordinates and texts of the plurality of cells.

The table extraction model is an enhanced base model enhanced from the base model to classify the tables into structured and unstructured tables, and detect cell coordinates and cell content of the plurality of cells.

In certain implementations, the searchable table extraction system 100 obtains a first input document image including at least one first table and text, as an input to the table extraction model. The table extraction model extracts the at least one first table from the first input document image, where the at least one first table is a structured table. The searchable table extraction system 100 obtains a second input document image including at least one second table and text, as an input to the table extraction model. The table extraction model extracts the at least one second table from the second input document image, where the at least one second table is an unstructured table including at least one nested table.

Figure 10:
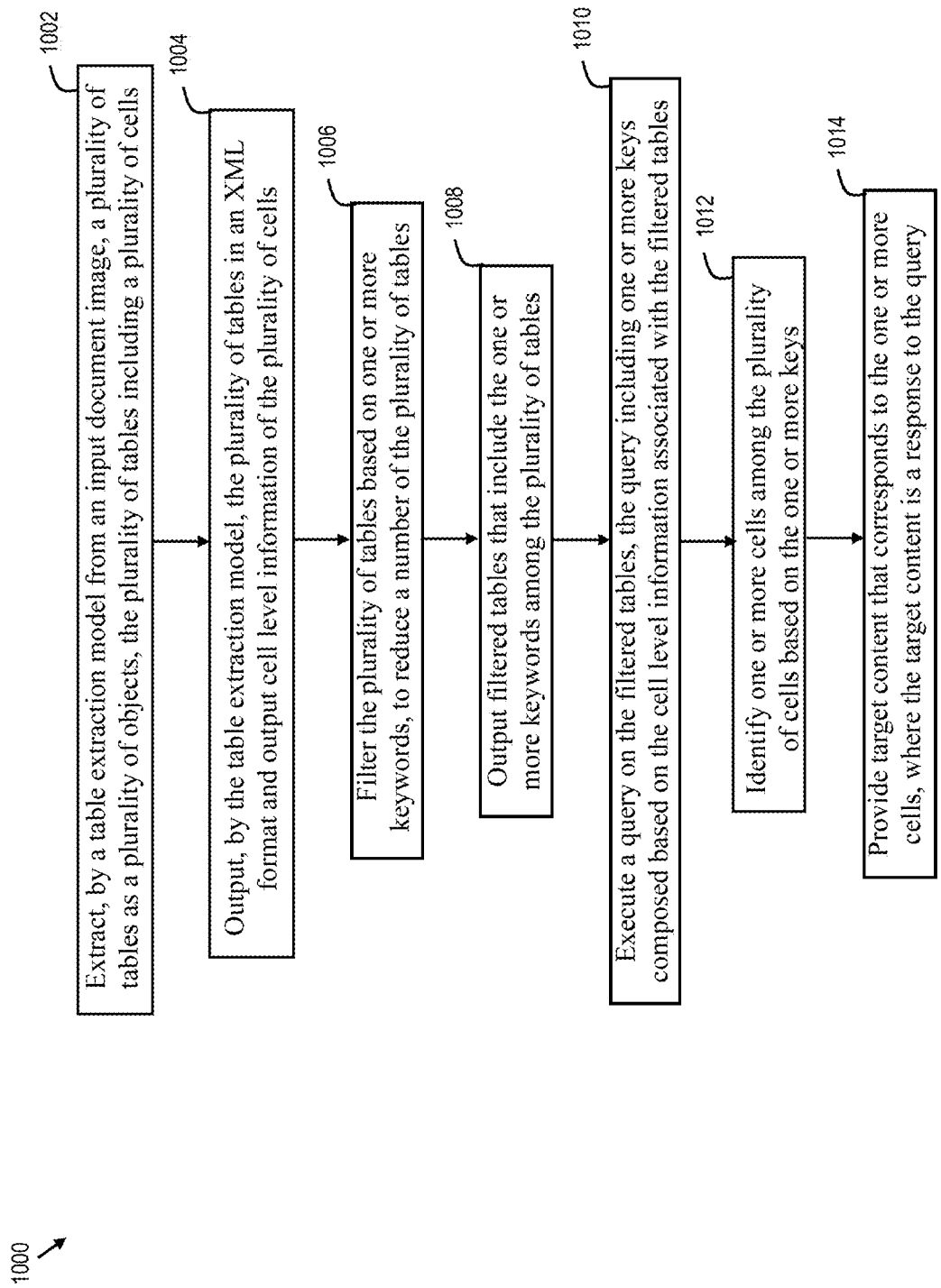
FIG. 10 depicts processing performed by the searchable table extraction system according to various embodiments.

FIG. 10 depicts processing according to various embodiments. For example, the processing 1000 depicted in FIG. 10 may be performed by all or some of the training data generation subsystem 102, the table extraction model generation subsystem 104, the table extraction subsystem 105, the filtering subsystem 106, and the query executing subsystem 108.

The processing 1000 depicted in FIG. 10 may be implemented in software (e.g., code, instructions, program) executed by one or more processing units (e.g., processors, cores) of the respective subsystems, using hardware, or combinations thereof. The software may be stored on a non-transitory storage medium (e.g., on a memory device). The method presented in FIG. 10 and described below is intended to be illustrative and non-limiting. Although FIG. 10 depicts the various processing operations occurring in a particular sequence or order, this is not intended to be limiting. In certain alternative embodiments, the processing 1000 may be performed in some different order or some operations may be performed at least partially in parallel.

With continuing reference to FIG. 10, at 1002, a plurality of tables are extracted as a plurality of objects by a table extraction model 140 from an input document image, the plurality of tables including a plurality of cells, respectively.

In some embodiments, the searchable table extraction system 100 extracts, as cell level information, coordinates of the plurality of cells.

In certain implementations, prior to the extracting the plurality of tables, the searchable table extraction system 100 generates the table extraction model by performing an iterative learning transfer, where the performing the iterative learning transfer includes training a pretrained model using a base training dataset including training datapoints associated with tables in historical document images including tables and text, to generate a base model; and training the base model using an enhanced training dataset, to generate the table extraction model, the enhanced training dataset including training datapoints associated with the plurality of cells disposed in each of the tables.

At 1004, the plurality of tables are output by the table extraction model 140 in an XML, format, where cell level information of the plurality of cells is also output.

At 1006, the searchable table extraction system 100 filters the plurality of tables based on one or more keywords, to reduce a number of the plurality of tables, where the one or more keywords are included in a plurality of keywords.

In some embodiments, the searchable table extraction system 100 filters the plurality of tables by obtaining a condition for the filtering, the condition including one from among AND and OR. For each of the plurality of keywords, the searchable table extraction system 100 generates a sub-keywords list including one or more sub-keywords, where each of the one or more sub-keywords is composed of one or more words of the keyword, and traverses each of the plurality of tables along a row direction and a column direction using, one by one, the one or more sub-keywords from the sub-keywords list. It is determined whether at least one table of the plurality of tables contains a first keyword of the plurality of keywords, and whether the at least one table contains a second keyword of the plurality of keywords.

If the condition is AND, the searchable table extraction system 100, based on the at least one table containing the first keyword and the second keyword, outputs the at least one table as at least one filtered table. Based on the at least one table not containing the first keyword and the second keyword, the searchable table extraction system 100 does not output the at least one table.

If the condition is OR, the searchable table extraction system 100, based on the at least one table containing at least one from among the first keyword and the second keyword, outputs the at least one table, as the at least one filtered table.

In some embodiments, the searchable table extraction system 100 initializes a vector including an array having a number of elements equal to a number of the plurality of keywords, based on the at least one table containing the first keyword, generates a value of 1 as a first element of the array, and based on the at least one table containing the second keyword, generates a value of 1 as a second element of the array. If the condition is AND, the searchable table extraction system 100 outputs the at least one table if the first element and the second element have the value of 1. If the condition is OR, the searchable table extraction system 100 outputs the at least one table if at least one from among the first element and the second element has the value of 1.

At 1008, the searchable table extraction system 100 outputs filtered tables that include the one or more keywords among the plurality of tables.

At 1010, the searchable table extraction system 100 executes a query on the filtered tables, the query including one or more keys composed based on the cell level information associated with the filtered tables.

In some embodiments, the searchable table extraction system 100 obtains cell level information associated with each of the filtered tables, the cell level information including, for each of the filtered tables, coordinates of cells and table architecture, and derives grammar and rules specific to each of the filtered tables, using the coordinates of cells and the table architecture.

The searchable table extraction system 100 creates the query based on the grammar and rules specific to each of the filtered tables.

In some embodiments, at least one of the filtered tables is a nested table, and the query further includes at least one composite key that expresses parent-child relationship of a header and at least one sub-header present in the nested table.

At 1012, the searchable table extraction system 100 identifies one or more cells among the plurality of cells based on the one or more keys.

At 1014, the searchable table extraction system 100 provides target content that corresponds to the one or more cells, where the target content is a response to the query.

In various embodiments, the searchable table extraction system 100 can extract complex tables such as, e.g., tables in nested format, unstructured tables, etc., present within a large document. A capability is provided to extract all tables, filter the extracted tables based on keywords, to obtain fewer tables, and perform SQL-like queries on the fewer tables, thereby preserving the computational resources and storage, and providing the results to the customer much faster than the techniques of the related art. That is, because the number of the tables is reduced, the query of the novel technique is executed on only the tables of interest and not on all tables extracted from large documents, as in the techniques of the related art.

In various embodiments, the searchable table extraction system 100 automatically identifies the table orientation (with the help of composite keys), e.g., whether the tables are left-right or top-bottom oriented, and runs the query accordingly.

IV. Illustrative Systems

FIG. 11 depicts a simplified diagram of a distributed system 1100. In the illustrated example, distributed system 1100 includes one or more client computing devices 1102, 1104, 1106, and 1108, coupled to a server 1112 via one or more communication networks 1110. Clients computing devices 1102, 1104, 1106, and 1108 may be configured to execute one or more applications.

In various examples, server 1112 may be adapted to run one or more services or software applications that enable one or more embodiments described in this disclosure. In certain examples, server 1112 may also provide other services or software applications that may include non-virtual and virtual environments. In some examples, these services may be offered as web-based or cloud services, such as under a Software as a Service (SaaS) model to the users of client computing devices 1102, 1104, 1106, and/or 1108. Users operating the client computing devices 1102, 1104, 1106, and/or 1108 may in turn utilize one or more client applications to interact with server 1112 to utilize the services provided by these components.

In the configuration depicted in FIG. 11, server 1112 may include one or more components 1118, 1120 and 1122 that implement the functions performed by server 1112. These components may include software components that may be executed by one or more processors, hardware components, or combinations thereof. It should be appreciated that various different system configurations are possible, which may be different from distributed system 1100. The example shown in FIG. 11 is thus one example of a distributed system for implementing an example system and is not intended to be limiting.

Users may use the client computing devices 1102, 1104, 1106, and/or 1108 to execute one or more applications, models or chatbots, which may generate one or more events or models that may then be implemented or serviced in accordance with the teachings of this disclosure. A client device may provide an interface that enables a user of the client device to interact with the client device. The client device may also output information to the user via this interface. Although FIG. 11 depicts only four client computing devices, any number of client computing devices may be supported.

The client devices may include various types of computing systems such as portable handheld devices, general purpose computers such as personal computers and laptops, workstation computers, wearable devices, gaming systems, thin clients, various messaging devices, sensors or other sensing devices, and the like. These computing devices may run various types and versions of software applications and operating systems (e.g., Microsoft Windows®, Apple Macintosh®, UNIX® or UNIX-like operating systems, Linux or Linux-like operating systems such as Google Chrome™ OS) including various mobile operating systems (e.g., Microsoft Windows Mobile®, iOS®, Windows Phone®, Android™, BlackBerry®, Palm OS®). Portable handheld devices may include cellular phones, smartphones, (e.g., an) iPhone®, tablets (e.g.,) iPad®, personal digital assistants (PDAs), and the like. Wearable devices may include Google Glass® head mounted display, and other devices. Gaming systems may include various handheld gaming devices, Internet-enabled gaming devices (e.g., a Microsoft Xbox® gaming console with or without a Kinect® gesture input device, Sony PlayStation® system, various gaming systems provided by Nintendo®, and others), and the like. The client devices may be capable of executing various different applications such as various Internet-related apps, communication applications (e.g., E-mail applications, short message service (SMS) applications) and may use various communication protocols.

Communication network(s) 1110 may be any type of network familiar to those skilled in the art that may support data communications using any of a variety of available protocols, including without limitation TCP/IP (transmission control protocol/Internet protocol), SNA (systems network architecture), IPX (Internet packet exchange), AppleTalk®, and the like. Merely by way of example, communication network(s) 1110 may be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth®, and/or any other wireless protocol), and/or any combination of these and/or other networks.

Server 1112 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 1112 may include one or more virtual machines running virtual operating systems, or other computing architectures involving virtualization such as one or more flexible pools of logical storage devices that may be virtualized to maintain virtual storage devices for the server. In various examples, server 1112 may be adapted to run one or more services or software applications that provide the functionality described in the foregoing disclosure.

The computing systems in server 1112 may run one or more operating systems including any of those discussed above, as well as any commercially available server operating system. Server 1112 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle®, Microsoft®, Sybase®, IBM® (International Business Machines), and the like.

In some implementations, server 1112 may include one or more applications to analyze and consolidate data feeds and/or event updates received from users of client computing devices 1102, 1104, 1106, and 1108. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 1112 may also include one or more applications to display the data feeds and/or real-time events via one or more display devices of client computing devices 1102, 1104, 1106, and 1108.

Distributed system 1100 may also include one or more data repositories 1114, 1116. These data repositories may be used to store data and other information in certain examples. For example, one or more of the data repositories 1114, 1116 may be used to store information such as information related to chatbot performance or generated models for use by chatbots used by server 1112 when performing various functions in accordance with various embodiments. Data repositories 1114, 1116 may reside in a variety of locations. For example, a data repository used by server 1112 may be local to server 1112 or may be remote from server 1112 and in communication with server 1112 via a network-based or dedicated connection. Data repositories 1114, 1116 may be of different types. In certain examples, a data repository used by server 1112 may be a database, for example, a relational database, such as databases provided by Oracle Corporation® and other vendors. One or more of these databases may be adapted to enable storage, update, and retrieval of data to and from the database in response to SQL-formatted commands.

In certain examples, one or more of data repositories 1114, 1116 may also be used by applications to store application data. The data repositories used by applications may be of different types such as, for example, a key-value store repository, an object store repository, or a general storage repository supported by a file system.

In certain examples, the functionalities described in this disclosure may be offered as services via a cloud environment. FIG. 12 is a simplified block diagram of a cloud-based system environment in which various services may be offered as cloud services in accordance with certain examples. In the example depicted in FIG. 12, cloud infrastructure system 1202 may provide one or more cloud services that may be requested by users using one or more client computing devices 1204, 1206, and 1208. Cloud infrastructure system 1202 may include one or more computers and/or servers that may include those described above for server 1112. The computers in cloud infrastructure system 1202 may be organized as general purpose computers, specialized server computers, server farms, server clusters, or any other appropriate arrangement and/or combination.

Network(s) 1210 may facilitate communication and exchange of data between client computing devices 1204, 1206, and 1208 and cloud infrastructure system 1202. Network(s) 1210 may include one or more networks. The networks may be of the same or different types. Network(s) 1210 may support one or more communication protocols, including wired and/or wireless protocols, for facilitating the communications.

The example depicted in FIG. 12 is only one example of a cloud infrastructure system and is not intended to be limiting. It should be appreciated that, in some other examples, cloud infrastructure system 1202 may have more or fewer components than those depicted in FIG. 12, may combine two or more components, or may have a different configuration or arrangement of components. For example, although FIG. 12 depicts three client computing devices, any number of client computing devices may be supported in alternative examples.

The term cloud service is generally used to refer to a service that is made available to users on demand and via a communication network such as the Internet by systems (e.g., cloud infrastructure system 1202) of a service provider. Typically, in a public cloud environment, servers and systems that make up the cloud service provider's system are different from the customer's own on-premises servers and systems. The cloud service provider's systems are managed by the cloud service provider. Customers may thus avail themselves of cloud services provided by a cloud service provider without having to purchase separate licenses, support, or hardware and software resources for the services. For example, a cloud service provider's system may host an application, and a user may, via the Internet, on demand, order and use the application without the user having to buy infrastructure resources for executing the application. Cloud services are designed to provide easy, scalable access to applications, resources and services. Several providers offer cloud services. For example, several cloud services are offered by Oracle Corporation® of Redwood Shores, California, such as middleware services, database services, Java cloud services, and others.

In certain examples, cloud infrastructure system 1202 may provide one or more cloud services using different models such as under a Software as a Service (SaaS) model, a Platform as a Service (PaaS) model, an Infrastructure as a Service (IaaS) model, and others, including hybrid service models. Cloud infrastructure system 1202 may include a suite of applications, middleware, databases, and other resources that enable provision of the various cloud services.

A SaaS model enables an application or software to be delivered to a customer over a communication network like the Internet, as a service, without the customer having to buy the hardware or software for the underlying application. For example, a SaaS model may be used to provide customers access to on-demand applications that are hosted by cloud infrastructure system 1202. Examples of SaaS services provided by Oracle Corporation® include, without limitation, various services for human resources/capital management, customer relationship management (CRM), enterprise resource planning (ERP), supply chain management (SCM), enterprise performance management (EPM), analytics services, social applications, and others.

An IaaS model is generally used to provide infrastructure resources (e.g., servers, storage, hardware and networking resources) to a customer as a cloud service to provide elastic compute and storage capabilities. Various IaaS services are provided by Oracle Corporation®.

A PaaS model is generally used to provide, as a service, platform and environment resources that enable customers to develop, run, and manage applications and services without the customer having to procure, build, or maintain such resources. Examples of PaaS services provided by Oracle Corporation® include, without limitation, Oracle Java Cloud Service (JCS), Oracle Database Cloud Service (DBCS), data management cloud service, various application development solutions services, and others.

Cloud services are generally provided on an on-demand self-service basis, subscription-based, elastically scalable, reliable, highly available, and secure manner. For example, a customer, via a subscription order, may order one or more services provided by cloud infrastructure system 1202. Cloud infrastructure system 1202 then performs processing to provide the services requested in the customer's subscription order. For example, a user may use utterances to request the cloud infrastructure system to take a certain action (e.g., an intent), as described above, and/or provide services for a chatbot system as described herein. Cloud infrastructure system 1202 may be configured to provide one or even multiple cloud services.

Cloud infrastructure system 1202 may provide the cloud services via different deployment models. In a public cloud model, cloud infrastructure system 1202 may be owned by a third party cloud services provider and the cloud services are offered to any general public customer, where the customer may be an individual or an enterprise. In certain other examples, under a private cloud model, cloud infrastructure system 1202 may be operated within an organization (e.g., within an enterprise organization) and services provided to customers that are within the organization. For example, the customers may be various departments of an enterprise such as the Human Resources department, the Payroll department, etc. or even individuals within the enterprise. In certain other examples, under a community cloud model, the cloud infrastructure system 1202 and the services provided may be shared by several organizations in a related community. Various other models such as hybrids of the above mentioned models may also be used.

Client computing devices 1204, 1206, and 1208 may be of different types (such as client computing devices 1102, 1104, 1106, and 1108 depicted in FIG. 11) and may be capable of operating one or more client applications. A user may use a client device to interact with cloud infrastructure system 1202, such as to request a service provided by cloud infrastructure system 1202. For example, a user may use a client device to request information or action from a chatbot as described in this disclosure.

In some examples, the processing performed by cloud infrastructure system 1202 for providing services may involve model training and deployment. This analysis may involve using, analyzing, and manipulating data sets to train and deploy one or more models. This analysis may be performed by one or more processors, possibly processing the data in parallel, performing simulations using the data, and the like. For example, big data analysis may be performed by cloud infrastructure system 1202 for generating and training one or more models for a chatbot system. The data used for this analysis may include structured data (e.g., data stored in a database or structured according to a structured model) and/or unstructured data (e.g., data blobs (binary large objects)).

As depicted in the example in FIG. 12, cloud infrastructure system 1202 may include infrastructure resources 1230 that are utilized for facilitating the provision of various cloud services offered by cloud infrastructure system 1202. Infrastructure resources 1230 may include, for example, processing resources, storage or memory resources, networking resources, and the like. In certain examples, the storage virtual machines that are available for servicing storage requested from applications may be part of cloud infrastructure system 1202. In other examples, the storage virtual machines may be part of different systems.

In certain examples, to facilitate efficient provisioning of these resources for supporting the various cloud services provided by cloud infrastructure system 1202 for different customers, the resources may be bundled into sets of resources or resource modules (also referred to as "pods"). Each resource module or pod may include a pre-integrated and optimized combination of resources of one or more types. In certain examples, different pods may be pre-provisioned for different types of cloud services. For example, a first set of pods may be provisioned for a database service, a second set of pods, which may include a different combination of resources than a pod in the first set of pods, may be provisioned for Java service, and the like. For some services, the resources allocated for provisioning the services may be shared between the services.

Cloud infrastructure system 1202 may itself internally use services 1232 that are shared by different components of cloud infrastructure system 1202 and which facilitate the provisioning of services by cloud infrastructure system 1202. These internal shared services may include, without limitation, a security and identity service, an integration service, an enterprise repository service, an enterprise manager service, a virus scanning and whitelist service, a high availability, backup and recovery service, service for enabling cloud support, an email service, a notification service, a file transfer service, and the like.

Cloud infrastructure system 1202 may include multiple subsystems. These subsystems may be implemented in software, or hardware, or combinations thereof. As depicted in FIG. 12, the subsystems may include a user interface subsystem 1212 that enables users or customers of cloud infrastructure system 1202 to interact with cloud infrastructure system 1202. User interface subsystem 1212 may include various different interfaces such as a web interface 1214, an online store interface 1216 where cloud services provided by cloud infrastructure system 1202 are advertised and are purchasable by a consumer, and other interfaces 1218. For example, a customer may, using a client device, request (service request 1234) one or more services provided by cloud infrastructure system 1202 using one or more of interfaces 1214, 1216, and 1218. For example, a customer may access the online store, browse cloud services offered by cloud infrastructure system 1202, and place a subscription order for one or more services offered by cloud infrastructure system 1202 that the customer wishes to subscribe to. The service request may include information identifying the customer and one or more services that the customer desires to subscribe to. For example, a customer may place a subscription order for a service offered by cloud infrastructure system 1202. As part of the order, the customer may provide information identifying a chatbot system for which the service is to be provided and optionally one or more credentials for the chatbot system.

In certain examples, such as the example depicted in FIG. 12, cloud infrastructure system 1202 may include an order management subsystem (OMS) 1220 that is configured to process the new order. As part of this processing, OMS 1220 may be configured to: create an account for the customer, if not done already; receive billing and/or accounting information from the customer that is to be used for billing the customer for providing the requested service to the customer; verify the customer information; upon verification, book the order for the customer; and orchestrate various workflows to prepare the order for provisioning.

Once properly validated, OMS 1220 may then invoke the order provisioning subsystem (OPS) 1224 that is configured to provision resources for the order including processing, memory, and networking resources. The provisioning may include allocating resources for the order and configuring the resources to facilitate the service requested by the customer order. The manner in which resources are provisioned for an order and the type of the provisioned resources may depend upon the type of cloud service that has been ordered by the customer. For example, according to one workflow, OPS 1224 may be configured to determine the particular cloud service being requested and identify a number of pods that may have been pre-configured for that particular cloud service. The number of pods that are allocated for an order may depend upon the size/amount/level/scope of the requested service. For example, the number of pods to be allocated may be determined based upon the number of users to be supported by the service, the duration of time for which the service is being requested, and the like. The allocated pods may then be customized for the particular requesting customer for providing the requested service.

In certain examples, setup phase processing, as described above, may be performed by cloud infrastructure system 1202 as part of the provisioning process. Cloud infrastructure system 1202 may generate an application ID and select a storage virtual machine for an application from among storage virtual machines provided by cloud infrastructure system 1202 itself or from storage virtual machines provided by other systems other than cloud infrastructure system 1202.

Cloud infrastructure system 1202 may send a response or notification 1244 to the requesting customer to indicate when the requested service is now ready for use. In some instances, information (e.g., a link) may be sent to the customer that enables the customer to start using and availing the benefits of the requested services. In certain examples, for a customer requesting the service, the response may include a chatbot system ID generated by cloud infrastructure system 1202 and information identifying a chatbot system selected by cloud infrastructure system 1202 for the chatbot system corresponding to the chatbot system ID.

Cloud infrastructure system 1202 may provide services to multiple customers. For each customer, cloud infrastructure system 1202 is responsible for managing information related to one or more subscription orders received from the customer, maintaining customer data related to the orders, and providing the requested services to the customer. Cloud infrastructure system 1202 may also collect usage statistics regarding a customer's use of subscribed services. For example, statistics may be collected for the amount of storage used, the amount of data transferred, the number of users, and the amount of system up time and system down time, and the like. This usage information may be used to bill the customer. Billing may be done, for example, on a monthly cycle.

Cloud infrastructure system 1202 may provide services to multiple customers in parallel. Cloud infrastructure system 1202 may store information for these customers, including possibly proprietary information. In certain examples, cloud infrastructure system 1202 includes an identity management subsystem (IMS) 1228 that is configured to manage customer information and provide the separation of the managed information such that information related to one customer is not accessible by another customer. IMS 1228 may be configured to provide various security-related services such as identity services, such as information access management, authentication and authorization services, services for managing customer identities and roles and related capabilities, and the like.

Figure 13:
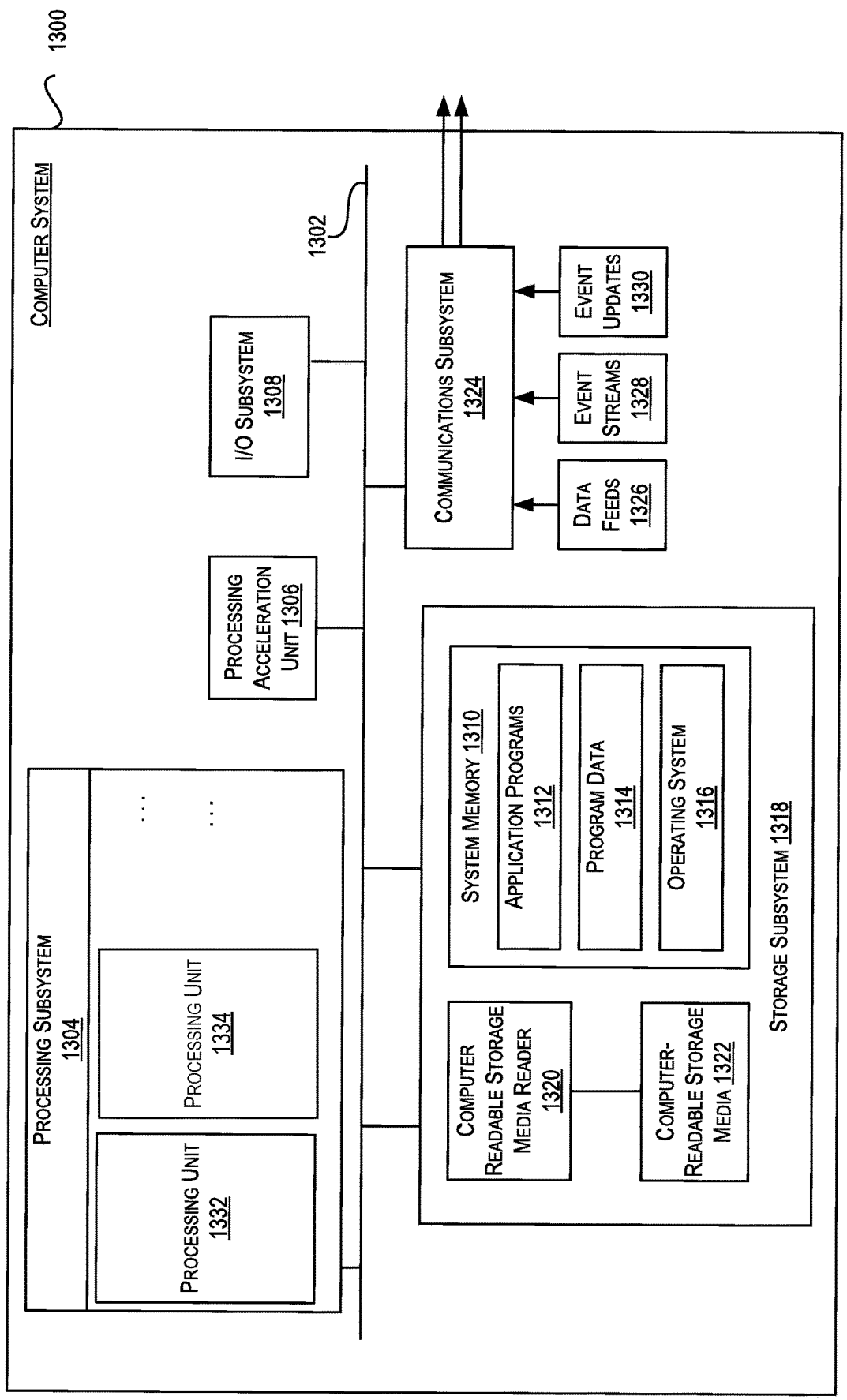
FIG. 13 illustrates an example computer system that may be used to implement various embodiments.

FIG. 13 illustrates an example of computer system 1300. In some examples, computer system 1300 may be used to implement any of the digital assistant or chatbot systems within a distributed environment, and various servers and computer systems described above. As shown in FIG. 13, computer system 1300 includes various subsystems including a processing subsystem 1304 that communicates with a number of other subsystems via a bus subsystem 1302. These other subsystems may include a processing acceleration unit 1306, an I/O subsystem 1308, a storage subsystem 1318, and a communications subsystem 1324. Storage subsystem 1318 may include non-transitory computer-readable storage media including computer-readable storage media 1322 and a system memory 1310.

Bus subsystem 1302 provides a mechanism for letting the various components and subsystems of computer system 1300 communicate with each other as intended. Although bus subsystem 1302 is shown schematically as a single bus, alternative examples of the bus subsystem may utilize multiple buses. Bus subsystem 1302 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which may be implemented as a Mezzanine bus manufactured to the IEEE P1386.1 standard, and the like.

Processing subsystem 1304 controls the operation of computer system 1300 and may include one or more processors, application specific integrated circuits (ASICs), or field programmable gate arrays (FPGAs). The processors may include be single core or multicore processors. The processing resources of computer system 1300 may be organized into one or more processing units 1332, 1334, etc. A processing unit may include one or more processors, one or more cores from the same or different processors, a combination of cores and processors, or other combinations of cores and processors. In some examples, processing subsystem 1304 may include one or more special purpose co-processors such as graphics processors, digital signal processors (DSPs), or the like. In some examples, some or all of the processing units of processing subsystem 1304 may be implemented using customized circuits, such as application specific integrated circuits (ASICs), or field programmable gate arrays (FPGAs).

In some examples, the processing units in processing subsystem 1304 may execute instructions stored in system memory 1310 or on computer-readable storage media 1322. In various examples, the processing units may execute a variety of programs or code instructions and may maintain multiple concurrently executing programs or processes. At any given time, some or all of the program code to be executed may be resident in system memory 1310 and/or on computer-readable storage media 1322 including potentially on one or more storage devices. Through suitable programming, processing subsystem 1304 may provide various functionalities described above. In instances where computer system 1300 is executing one or more virtual machines, one or more processing units may be allocated to each virtual machine.

In certain examples, a processing acceleration unit 1306 may optionally be provided for performing customized processing or for off-loading some of the processing performed by processing subsystem 1304 so as to accelerate the overall processing performed by computer system 1300.

I/O subsystem 1308 may include devices and mechanisms for inputting information to computer system 1300 and/or for outputting information from or via computer system 1300. In general, use of the term input device is intended to include all possible types of devices and mechanisms for inputting information to computer system 1300. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as inputs to an input device (e.g., Google Glass®). Additionally, user interface input devices may include voice recognition sensing devices that enable users to interact with voice recognition systems (e.g., Siri® navigator) through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments and the like.

In general, use of the term output device is intended to include all possible types of devices and mechanisms for outputting information from computer system 1300 to a user or other computer. User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 1318 provides a repository or data store for storing information and data that is used by computer system 1300. Storage subsystem 1318 provides a tangible non-transitory computer-readable storage medium for storing the basic programming and data constructs that provide the functionality of some examples. Storage subsystem 1318 may store software (e.g., programs, code modules, instructions) that when executed by processing subsystem 1304 provides the functionality described above. The software may be executed by one or more processing units of processing subsystem 1304. Storage subsystem 1318 may also provide authentication in accordance with the teachings of this disclosure.

Storage subsystem 1318 may include one or more non-transitory memory devices, including volatile and non-volatile memory devices. As shown in FIG. 13, storage subsystem 1318 includes a system memory 1310 and a computer-readable storage media 1322. System memory 1310 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 1300, such as during start-up, may typically be stored in the ROM. The RAM typically contains data and/or program modules that are presently being operated and executed by processing subsystem 1304. In some implementations, system memory 1310 may include multiple different types of memory, such as static random access memory (SRAM), dynamic random access memory (DRAM), and the like.

By way of example, and not limitation, as depicted in FIG. 13, system memory 1310 may load application programs 1312 that are being executed, which may include various applications such as Web browsers, mid-tier applications, relational database management systems (RDBMS), etc., program data 1314, and an operating system 1316. By way of example, operating system 1316 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, Palm® OS operating systems, and others.

Computer-readable storage media 1322 may store programming and data constructs that provide the functionality of some examples. Computer-readable storage media 1322 may provide storage of computer-readable instructions, data structures, program modules, and other data for computer system 1300. Software (programs, code modules, instructions) that, when executed by processing subsystem 1304 provides the functionality described above, may be stored in storage subsystem 1318. By way of example, computer-readable storage media 1322 may include non-volatile memory such as a hard disk drive, a magnetic disk drive, an optical disk drive such as a CD ROM, DVD, a Blu-Ray® disk, or other optical media. Computer-readable storage media 1322 may include, but is not limited to, Zip® drives, flash memory cards, universal serial bus (USB) flash drives, secure digital (SD) cards, DVD disks, digital video tape, and the like. Computer-readable storage media 1322 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs.

In certain examples, storage subsystem 1318 may also include a computer-readable storage media reader 1320 that may further be connected to computer-readable storage media 1322. The computer-readable storage media reader 1320 may receive and be configured to read data from a memory device such as a disk, a flash drive, etc.

In certain examples, computer system 1300 may support virtualization technologies, including but not limited to virtualization of processing and memory resources. For example, computer system 1300 may provide support for executing one or more virtual machines. In certain examples, computer system 1300 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 1300. Accordingly, multiple operating systems may potentially be run concurrently by computer system 1300.

Communications subsystem 1324 provides an interface to other computer systems and networks. Communications subsystem 1324 serves as an interface for receiving data from and transmitting data to other systems from computer system 1300. For example, communications subsystem 1324 may enable computer system 1300 to establish a communication channel to one or more client devices via the Internet for receiving and sending information from and to the client devices.

Communication subsystem 1324 may support both wired and/or wireless communication protocols. In certain examples, communications subsystem 1324 may include radio frequency (RF) transceiver components for accessing wireless voice and/or data networks (e.g., using cellular telephone technology), advanced data network technology, such as 3G, 4G or EDGE (enhanced data rates for global evolution), WiFi (IEEE 1002.XX family standards, or other mobile communication technologies, or any combination thereof), global positioning system (GPS) receiver components, and/or other components. In some examples, communications subsystem 1324 may provide wired network connectivity (e.g., Ethernet) in addition to or instead of a wireless interface.

Communication subsystem 1324 may receive and transmit data in various forms. In some examples, in addition to other forms, communications subsystem 1324 may receive input communications in the form of structured and/or unstructured data feeds 1326, event streams 1328, event updates 1330, and the like. For example, communications subsystem 1324 may be configured to receive (or send) data feeds 1326 in real-time from users of social media networks and/or other communication services such as Twitter® feeds, Facebook® updates, web feeds such as Rich Site Summary (RSS) feeds, and/or real-time updates from one or more third party information sources.

In certain examples, communications subsystem 1324 may be configured to receive data in the form of continuous data streams, which may include event streams 1328 of real-time events and/or event updates 1330, that may be continuous or unbounded in nature with no explicit end. Examples of applications that generate continuous data may include, for example, sensor data applications, financial tickers, network performance measuring tools (e.g. network monitoring and traffic management applications), click-stream analysis tools, automobile traffic monitoring, and the like.

Communications subsystem 1324 may also be configured to communicate data from computer system 1300 to other computer systems or networks. The data may be communicated in various different forms such as structured and/or unstructured data feeds 1326, event streams 1328, event updates 1330, and the like to one or more databases that may be in communication with one or more streaming data source computers coupled to computer system 1300.

Computer system 1300 may be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system. Due to the ever-changing nature of computers and networks, the description of computer system 1300 depicted in FIG. 13 is intended only as a specific example. Many other configurations having more or fewer components than the system depicted in FIG. 12 are possible. Based on the disclosure and teachings provided herein, it should be appreciated that there are other ways and/or methods to implement the various examples.

Although specific examples have been described, various modifications, alterations, alternative constructions, and equivalents are possible. Examples are not restricted to operation within certain specific data processing environments, but are free to operate within a plurality of data processing environments. Additionally, although certain examples have been described using a particular series of transactions and steps, it should be apparent to those skilled in the art that this is not intended to be limiting. Although some flowcharts describe operations as a sequential process, many of the operations may be performed in parallel or concurrently. In addition, the order of the operations may be rearranged. A process may have additional steps not included in the figure. Various features and aspects of the above-described examples may be used individually or jointly.

Further, while certain examples have been described using a particular combination of hardware and software, it should be recognized that other combinations of hardware and software are also possible. Certain examples may be implemented only in hardware, or only in software, or using combinations thereof. The various processes described herein may be implemented on the same processor or different processors in any combination.

Where devices, systems, components or modules are described as being configured to perform certain operations or functions, such configuration may be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes may communicate using a variety of techniques including but not limited to related art techniques for inter-process communications, and different pairs of processes may use different techniques, or the same pair of processes may use different techniques at different times.

Specific details are given in this disclosure to provide a thorough understanding of the examples. However, examples may be practiced without these specific details. For example, well-known circuits, processes, algorithms, structures, and techniques have been shown without unnecessary detail in order to avoid obscuring the examples. This description provides example examples only, and is not intended to limit the scope, applicability, or configuration of other examples. Rather, the preceding description of the examples will provide those skilled in the art with an enabling description for implementing various examples. Various changes may be made in the function and arrangement of elements.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific examples have been described, these are not intended to be limiting. Various modifications and equivalents are within the scope of the following claims.

In the foregoing specification, aspects of the disclosure are described with reference to specific examples thereof, but those skilled in the art will recognize that the disclosure is not limited thereto. Various features and aspects of the above-described disclosure may be used individually or jointly. Further, examples may be utilized in any number of environments and applications beyond those described herein without departing from the broader spirit and scope of the specification. The specification and drawings are, accordingly, to be regarded as illustrative rather than restrictive.

In the foregoing description, for the purposes of illustration, methods were described in a particular order. It should be appreciated that in alternate examples, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Where components are described as being configured to perform certain operations, such configuration may be accomplished, for example, by designing electronic circuits or other hardware to perform the operation, by programming programmable electronic circuits (e.g., microprocessors, or other suitable electronic circuits) to perform the operation, or any combination thereof.

While illustrative examples of the application have been described in detail herein, it is to be understood that the inventive concepts may be otherwise variously embodied and employed, and that the appended claims are intended to be construed to include such variations, except as limited by the prior art.

What is claimed is:

1. A computer-implemented method comprising:
    generating a base model by training a pretrained model using a base training dataset including first training datapoints identifying tables in historical document images that include the tables and text, wherein the generated base model is configured to extract the tables as objects; and
    generating a table extraction model by training the base model using an enhanced training dataset including second training datapoints that are different from the first training datapoints and identify a plurality of cells disposed in each of the tables in a row direction and a column direction,
    wherein the table extraction model is trained to output content of the tables and table information in an eXtensible Markup Language (XML) format, the table information including cell level information of the plurality of cells that is searchable via a query, and
    wherein the query is configured to provide target content that corresponds to one or more cells among the plurality of cells.

2. The computer-implemented method of claim 1, wherein the generating the base model further comprises:
    generating first annotated document images based on the historical document images, the first annotated document images comprising annotations indicating borders surrounding the tables, respectively, and tags indicating content within each of the borders to be a table;
    preprocessing the first annotated document images to generate augmented first annotated document images; and
    training the pretrained model using the augmented first annotated document images,
    wherein the augmented first annotated document images are the first training datapoints.

3. The computer-implemented method of claim 2, wherein the generating the table extraction model further comprises:
    generating second annotated document images based on the first annotated document images, the second annotated document images providing an indication of a table type and comprising annotations that include borders surrounding the plurality of cells, respectively, and tags indicating content within the borders surrounding the plurality of cells to correspond to a cell, wherein the table type is a structured table or an unstructured table;
    preprocessing the second annotated document images to generate augmented second annotated document images; and
    training the base model using the augmented second annotated document images,
    wherein the augmented second annotated document images are the second training datapoints.

4. The computer-implemented method of claim 3, wherein the table extraction model is configured to output the table information including the table type and table coordinates, and output the cell level information including coordinates and texts of the plurality of cells.

5. The computer-implemented method of claim 3, wherein:
    the preprocessing performed on the first annotated document images comprises performing at least one image-processing technique from among brightening, darkening, rotating, dilating, and smudging, and
    the preprocessing performed on the second annotated document images comprises performing at least one image-processing technique from among brightening, darkening, rotating, dilating, and smudging.

6. The computer-implemented method of claim 1, wherein:
    the pretrained model is a convolutional neural network (CNN) pretrained model configured to extract objects from images,
    the base model is a CNN-based model enhanced from the CNN pretrained model to extract tables as objects from document images, and
    the table extraction model is an enhanced base model enhanced from the base model to classify the tables into structured and unstructured tables, and detect cell coordinates and cell content of the plurality of cells.

7. The computer-implemented method of claim 1, further comprising:
obtaining an input document image including a plurality of tables within text, as an input to the table extraction model;
extracting, by the table extraction model, at least one first table among the plurality of tables from the input document image, wherein the at least one first table is a structured table; and
extracting, by the table extraction model, at least one second table among the plurality of tables from the input document image, wherein the at least one second table is an unstructured table including at least one nested table.

8. A computer system comprising:
one or more data processors; and
one or more non-transitory computer-readable storage media storing instructions that, when executed by the one or more data processors, cause the one or more data processors to perform a method including:
generating a base model by training a pretrained model using a base training dataset including first training datapoints identifying tables in historical document images that include the tables and text, wherein the generated base model is configured to extract the tables as objects; and
generating a table extraction model by training the base model using an enhanced training dataset including second training datapoints that are different from the first training datapoints and identify a plurality of cells disposed in each of the tables in a row direction and a column direction,
wherein the table extraction model is trained to output content of the tables and table information in an eXtensible Markup Language (XML) format, the table information including cell level information of the plurality of cells that is searchable via a query, and
wherein the query is configured to provide target content that corresponds to one or more cells among the plurality of cells.

9. The computer system of claim 8, wherein the generating the base model further includes:
generating first annotated document images based on the historical document images, the first annotated document images comprising annotations indicating borders surrounding the tables, respectively, and tags indicating content within each of the borders to be a table;
preprocessing the first annotated document images to generate augmented first annotated document images; and
training the pretrained model using the augmented first annotated document images,
wherein the augmented first annotated document images are the first training datapoints.

10. The computer system of claim 9, wherein the generating the table extraction model further includes:
generating second annotated document images based on the first annotated document images, the second annotated document images providing an indication of a table type and comprising annotations that include borders surrounding the plurality of cells, respectively, and tags indicating content within the borders surrounding the plurality of cells to correspond to a cell, wherein the table type is a structured table or an unstructured table;
preprocessing the second annotated document images to generate augmented second annotated document images; and
training the base model using the augmented second annotated document images,
wherein the augmented second annotated document images are the second training datapoints.

11. The computer system of claim 10, wherein the table extraction model is configured to output the table information including the table type and table coordinates, and output the cell level information including coordinates and texts of the plurality of cells.

12. The computer system of claim 8, wherein:
the pretrained model is a convolutional neural network (CNN) pretrained model configured to extract objects from images,
the base model is a CNN-based model enhanced from the CNN pretrained model to extract tables as objects from document images, and
the table extraction model is an enhanced base model enhanced from the base model to classify the tables into structured and unstructured tables, and detect cell coordinates and cell content of the plurality of cells.

13. A computer-program product tangibly embodied in one or more non-transitory computer-readable storage media including instructions configured to cause one or more data processors to perform a method including:
generating a base model by training a pretrained model using a base training dataset including first training datapoints identifying tables in historical document images that include the tables and text, wherein the generated base model is configured to extract the tables as objects; and
generating a table extraction model by training the base model using an enhanced training dataset including second training datapoints that are different from the first training datapoints and identify a plurality of cells disposed in each of the tables in a row direction and a column direction,
wherein the table extraction model is trained to output content of the tables and table information in an eXtensible Markup Language (XML) format, the table information including cell level information of the plurality of cells that is searchable via a query, and
wherein the query is configured to provide target content that corresponds to one or more cells among the plurality of cells.

14. The computer-program product of claim 13, wherein the generating the base model further includes:
generating first annotated document images based on the historical document images, the first annotated document images comprising annotations indicating borders surrounding the tables, respectively, and tags indicating content within each of the borders to be a table;
preprocessing the first annotated document images to generate augmented first annotated document images; and
training the pretrained model using the augmented first annotated document images,
wherein the augmented first annotated document images are the first training datapoints.

15. The computer-program product of claim 14, wherein the generating the table extraction model further includes:
generating second annotated document images based on the first annotated document images, the second annotated document images providing an indication of a table type and comprising annotations that include borders surrounding the plurality of cells, respectively, and tags indicating content within the borders surrounding the plurality of cells to correspond to a cell, wherein the table type is a structured table or an unstructured table;

preprocessing the second annotated document images to generate augmented second annotated document images; and training the base model using the augmented second annotated document images, wherein the augmented second annotated document images are the second training datapoints.

16. The computer-program product of claim 15, wherein the table extraction model is configured to output the table information including the table type and table coordinates, and output the cell level information including coordinates and texts of the plurality of cells.

17. The computer-program product of claim 13, wherein:
the pretrained model is a convolutional neural network (CNN) pretrained model configured to extract objects from images,
the base model is a CNN-based model enhanced from the CNN pretrained model to extract tables as objects from document images, and
the table extraction model is an enhanced base model enhanced from the base model to classify the tables into structured and unstructured tables, and detect cell coordinates and cell content of the plurality of cells.

18. A computer-implemented method comprising:
extracting, by a table extraction model from an input document image, a plurality of tables as a plurality of objects, the plurality of tables including a plurality of cells, respectively;
outputting, by the table extraction model, the plurality of tables in an eXtensible Markup Language (XML) format and outputting cell level information of the plurality of cells;
filtering the plurality of tables based on one or more keywords, to reduce a number of the plurality of tables;
outputting filtered tables that include the one or more keywords among the plurality of tables;
executing a query on the filtered tables, the query including one or more keys composed based on the cell level information associated with the filtered tables;
identifying one or more cells among the plurality of cells based on the one or more keys; and
providing target content that corresponds to the one or more cells, wherein the target content is a response to the query,
wherein:
the one or more keywords are included in a plurality of keywords, and
the filtering the plurality of tables further comprises:
obtaining a condition for the filtering, the condition comprising one from among AND and OR;
for each of the plurality of keywords:
generating a sub-keywords list comprising one or more sub-keywords, wherein each of the one or more sub-keywords is composed of one or more words of the keyword, and traversing each of the plurality of tables along a row direction and a column direction using, one by one, the one or more sub-keywords from the sub-keywords list;
determining whether at least one table of the plurality of tables contains a first keyword of the plurality of keywords;
determining whether the at least one table contains a second keyword of the plurality of keywords;
for the condition being AND:
based on the at least one table containing the first keyword and the second keyword, outputting the at least one table, as at least one filtered table, and
based on the at least one table not containing the first keyword and the second keyword, not outputting the at least one table; and
for the condition being OR:
based on the at least one table containing at least one from among the first keyword and the second keyword, outputting the at least one table, as the at least one filtered table,
wherein the at least one filtered table is included in the filtered tables.

19. The computer-implemented method of claim 18, wherein the filtering further comprises:
initializing a vector comprising an array having a number of elements equal to a number of the plurality of keywords,
based on the at least one table containing the first keyword, generating a value of 1 as a first element of the array,
based on the at least one table containing the second keyword, generating a value of 1 as a second element of the array,
based on the condition being AND, outputting the at least one table if the first element and the second element have the value of 1, and
based on the condition being OR, outputting the at least one table if at least one from among the first element and the second element has the value of 1.

20. The computer-implemented method of claim 18, wherein the executing the query further comprises:
obtaining cell level information associated with each of the filtered tables, the cell level information comprising, for each of the filtered tables, coordinates of cells and table architecture;
deriving grammar and rules specific to each of the filtered tables, using the coordinates of cells and the table architecture; and
creating the query based on the grammar and the rules specific to each of the filtered tables,
wherein:
at least one of the filtered tables is a nested table, and
the query further comprises at least one composite key that expresses parent-child relationship of a header and at least one sub-header present in the nested table.

* * * * *